US012086035B2

(12) United States Patent
Sarfare et al.

(10) Patent No.: US 12,086,035 B2
(45) Date of Patent: Sep. 10, 2024

(54) RECOVERY MECHANISM WITH SELECTIVE ORDERING AND CONCURRENT OPERATIONS

(71) Applicant: NetApp Inc., San Jose, CA (US)

(72) Inventors: Parag Sarfare, San Jose, CA (US); Asif Pathan, San Jose, CA (US); Amit Borase, San Mateo, CA (US); Nikhil Mattankot, Pleasanton, CA (US); Sudheer Kumar Vavilapalli, Sunnyvale, CA (US); Stephen Wu, Sacramento, CA (US)

(73) Assignee: NetApp, Inc., San Jose, CA (US)

( * ) Notice: Subject to any disclaimer, the term of this patent is extended or adjusted under 35 U.S.C. 154(b) by 210 days.

(21) Appl. No.: 17/886,843

(22) Filed: Aug. 12, 2022

(65) Prior Publication Data

US 2024/0054056 A1    Feb. 15, 2024

(51) Int. Cl.
*G06F 11/00* (2006.01)
*G06F 11/14* (2006.01)

(52) U.S. Cl.
CPC ...... *G06F 11/1469* (2013.01); *G06F 11/1464* (2013.01); *G06F 11/1471* (2013.01)

(58) Field of Classification Search
CPC ............. G06F 11/1451; G06F 11/1435; G06F 11/1469; G06F 11/1464; G06F 11/1471
See application file for complete search history.

(56) References Cited

U.S. PATENT DOCUMENTS

| 2019/0146911 A1* | 5/2019 | Ha ...................... G06F 11/1068 711/103 |
| 2021/0103555 A1* | 4/2021 | Kaplingat ........... G06F 11/1461 |
| 2022/0237082 A1* | 7/2022 | Gao ..................... G06F 11/1469 |

(Continued)

OTHER PUBLICATIONS

Application Data Protection, Mobility and Storage for Cloud Native Applications, 2022, Cloud Central, Astra Family, Astra—Protect, Move and Store Your Kubernetes Persistent Data, Reprinted from the Internet at: https://cloud.netapp.com/astra, 8 pgs.

(Continued)

*Primary Examiner* — Charles Ehne
(74) *Attorney, Agent, or Firm* — Cooper Legal Group, LLC

(57) ABSTRACT

Techniques are provided for a recovery process with selective ordering and concurrent operations in order to recover from a failure. Representations of active log structures are rebuilt within memory according to ordering values assigned to I/O operations logged within the active log structures. Representation of certain active log structures may be concurrently rebuilt based upon the active log structures comprising I/O operations that are non-overlapping within a distributed file system, have no dependencies, relate to different services, and/or target independent files. Representation of stale log structures are concurrently rebuilt within memory. While rebuilding the log structures and executing the I/O operations, a key value map is concurrently rebuilt within the memory for locating data of the I/O operations. Concurrent operations during the recovery process reduces (Continued)

the time to complete the recovery process, and thus reduces client downtime during the recovery process.

21 Claims, 17 Drawing Sheets

(56) References Cited

U.S. PATENT DOCUMENTS

2023/0350760 A1\* 11/2023 George .................. G06F 9/544

OTHER PUBLICATIONS

"Astra Control Service Documentation", Aug. 2022, NetApp, Astra Control Services, Reprinted from the Internet at: https://docs.netapp.com/us-en/astra-control-service/, 114 pgs.
"Containerization", Jun. 2021, IBM Cloud Education, IBM Cloud Learn Hub, Reprinted from the Internet at: https://www.ibm.com/cloud/learn/containerization, 14 pgs.
"Google Kubernetes Engine: Ultimate Quick Start Guide", Jun. 2021, Cloud Central, Reprinted from the Internet at: https://cloud.netapp.com/blog/gcp-cvo-blg-google-kubernetes-engine-ultimate-quick-start-guide, 9 pgs.
Production-Grade Container Orchestration, Cloud Native Computing Foundation, Reprinted from the Internet at: https://kubernetes.io, 6 pgs.
"NetApp WAFL, NVRAM and the System Memory Cache", NetApp tutorial—How Reads and Writes Work, FlackBox, Reprinted from the Internet at: https://www.flackbox.com/netapp-wafl-nvram-system-memory-cache, 40 pgs.
"NVRAM Purpose During ONTAP Outage", Mar. 2021, NetApp Knowledge Base, Reprinted from the Internet at: https://kb.netapp.com/Advice_and_Troubleshooting/Data_Storage_Software/ONTAP_OS/NVRAM_purpose_during_ONTAP_outage. 10 pgs.
"Stateful Apps on Kubernetes get a Bib Boose with Astra Data Store—NetApp's Latest Innovation", Oct. 2021, Cloud Central, Reprinted from the Internet at: https://cloud.netapp.com/blog/astra-blg-stateful-apps-on-kubernetes-get-a-big-boost-with-astra-data-store, 4 pgs.
"Kubernetes Applications get an Enterprise-Grade Data Platform with Astra Data Store", Apr. 2022, Cloud Central, Reprinted from the Internet at: https://cloud.netapp.com/blog/astra-blg-kubernetes-applications-get-an-enterprise-grade-platform-with-astra-data-store, 5 pgs.
GeeksforGeeks; Recovery With Concurrent Transactions; 7 Pgs.
GeeksforGeeks; Database Recovery Techniques in DBMS; 12 Pgs.
Tony Ansley; SnapMirror configuration and best practices guide for ONTAP 9; Jun. 2023; 90 Pgs.

\* cited by examiner

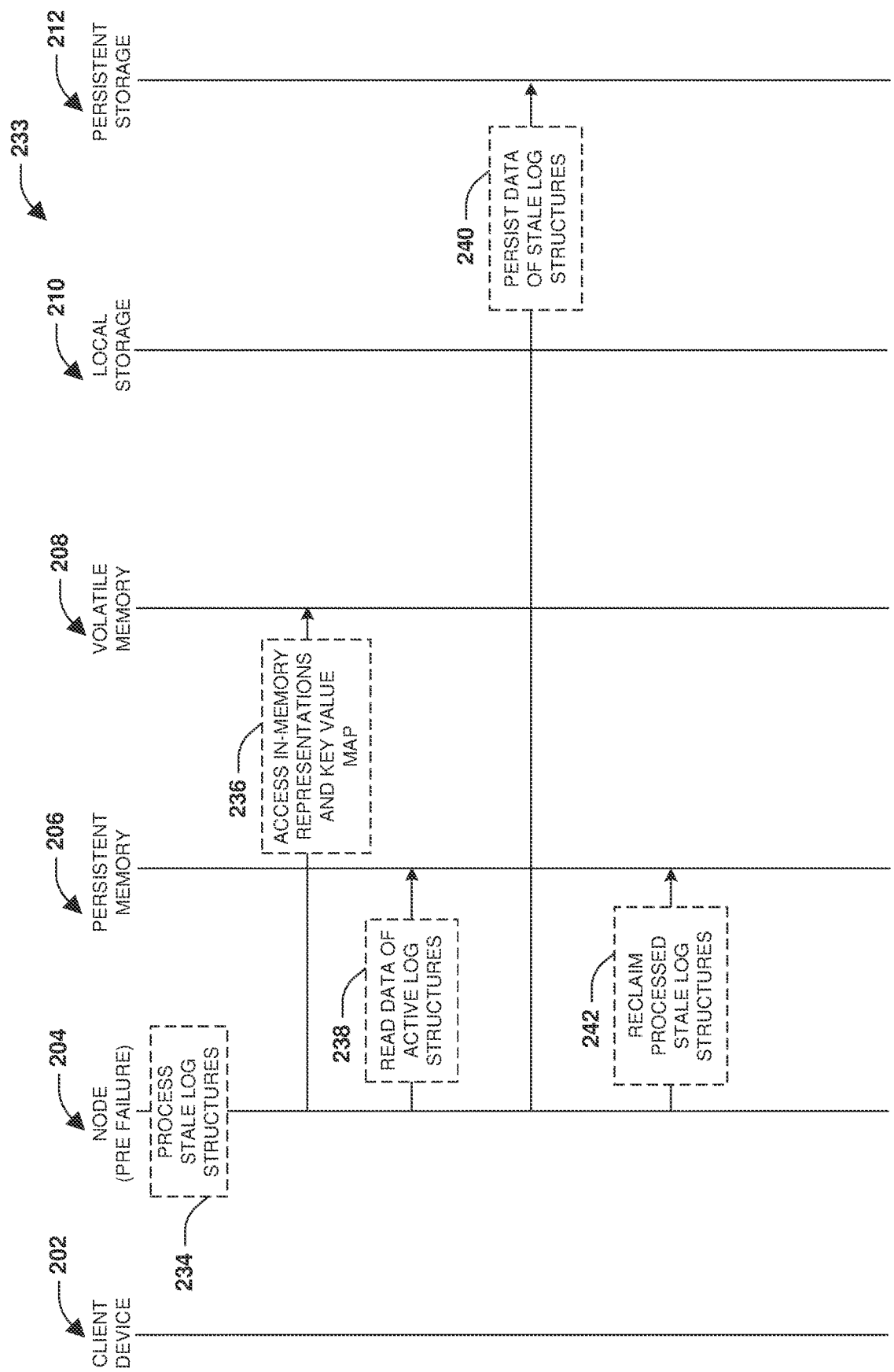

RECOVERY MECHANISM WITH SELECTIVE ORDERING AND CONCURRENT OPERATIONS

TECHNICAL FIELD

Various embodiments of the present technology relate to a recovery mechanism to recover from a failure. More specifically, some embodiments relate to a recovery mechanism that implements a rebuild process and an execution operation with selective order and concurrent operations.

BACKGROUND

A file system may utilize a log as a journal to track changes that have not yet been committed by the file system. If the file system experiences a crash or failure, then changes from the journal can be replayed in order to bring the file system into a consistent state. In this way, many file systems and applications that utilize journaling may support journal replay in order to recover from failures by restoring data to a pre-failure state. During the journal replay, clients are unable to access client data stored through the file system. To ensure correctness of the file system after journal replay, the changes are serially applied to the file system. Serially applying the changes is time consuming, and prolongs client downtime.

DESCRIPTION OF THE DRAWINGS

Embodiments of the present technology will be described and explained through the use of the accompanying drawings in which:

FIG. 2C is a sequence diagram illustrating an example of a set of operations for persisting data of logged I/O operation to persistent storage in accordance with various embodiments of the present technology.

Figure 1A:
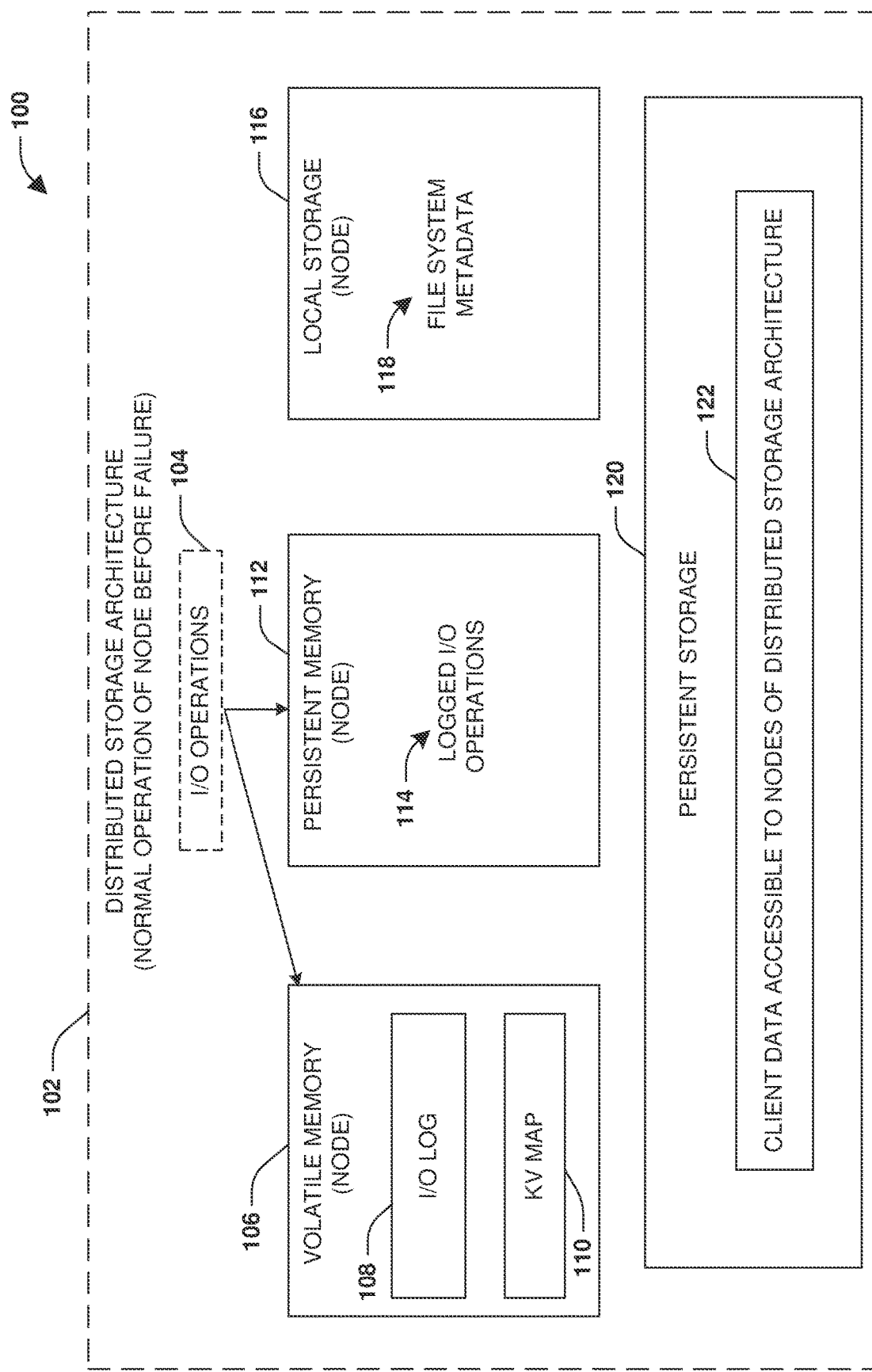
FIG. 1A is a block diagram illustrating an example of a distributed storage architecture where I/O operations are logged into persistent memory of a node in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

Various embodiments of the present technology relate to performing a recovery process to recover from a failure of a node. More specifically, some embodiments relate to improving the time to perform the recovery process through concurrent operations for improved performance. The node may store data on behalf of clients within persistent storage of a distributed storage architecture. When the node receives an I/O operation from a client, the node logs the I/O operation into a log structure in persistent memory and responds back to the client with a success message. The node can log the I/O operation more quickly into the faster persistent memory than the time it would take to execute the I/O operation due to the increased latency that would result from storing data of the I/O operation to a storage device of the distributed storage. In this way, the node can reduce client latency by logging I/O operations and responding back to the client without having to first execute the I/O operations. When I/O operations are logged, the I/O operations are assigned ordering values used to track the order with which the I/O operations are received. The ordering values can be used to identify the order which with the I/O operations were received and/or logged so that the I/O operations can be subsequently executed according to that order.

The node may perform consistency point operations to replay the logged I/O operations in order to update a distributed file system of the distributed storage architecture with metadata of the logged I/O operations and to store data of the logged I/O operations to the distributed storage. The consistency point operation is performed to place the distributed file system in a consistent state with respect to the I/O operations and to store data of the I/O operations into a non-temporary storage location. The I/O operations may be replayed according to the order of the ordering values so that the distributed file system is maintained in a consistent state with respect to the I/O operations being executed according to the order with which the node receives the I/O operations. Otherwise, inconsistencies, data loss, and errors could occur if certain I/O operations were performed out of order, such as where a write operation to a file is performed before a creation operation to create the file. Once metadata and data of a logged I/O operation has been replayed, storage space used to log the logged I/O operation can be reclaimed from the persistent memory for storing other data.

If the node and/or the distributed file system encounters a failure such as before the consistency point operation has completed, a recovery process is performed to bring the distributed file system back into a consistent state. The recovery process involves replaying the logged I/O operations stored within the log structures in the persistent memory. As part of the recovery process, a key value map and in-memory representations of the log structures are rebuilt within volatile memory of the node, which were lost due to the failure because of the volatile nature of the volatile memory. The key value map is an in-memory data structure used to locate data of the logged I/O operation stored within the persistent memory. The in-memory representations are used to define the structure and organization of the log structures storing the logged I/O operations. Without the in-memory representations, the logged I/O operations are merely data stored in the persistent memory at physical block locations. Thus, the in-memory representations are used to organize, validate, and replay the logged I/O operation within the log structures, and the key value map is used to locate the data of the logged I/O operations during replay.

Because the key value map and the in-memory representations are maintained within the volatile memory, the key value map and the in-memory representations were lost due the failure, and are rebuilt within the volatile memory. In this way, the recovery process includes rebuilding the key value map in the volatile memory for locating data of the I/O operations (e.g., serving read operations and/or for performing flush operations to store the data to persistent storage of the distributed storage architecture) and rebuilding the in-memory representations in the volatile memory for organizing, structuring, and representing the logged I/O operations and log structures. The recover process also includes applying metadata of the logged I/O operations to the distributed file system and storing data of the logged I/O operations to the distributed storage. Once complete, the distributed file system is in a consistent state, and the node can start accepting and processing I/O operations from clients.

During the recovery process, the node is not processing incoming I/O operations from clients because the distributed file system has not yet recovered into a consistent state. Clients are unable to access client data until the recovery process completes. Conventional recovery processes are time consuming because the recovery processes are performed in a non-optimize serial order. In particular, the in-memory representations are serially rebuilt in the volatile memory. Then, the in-memory representations are used to serially replay the log structures to update the distributed file system and store data to the distributed storage using the logged I/O operations. Furthermore, other recovery mechanisms being performed by the node (e.g., replay of other journals or logs) may also be performed in a serial order. The strict serial ordering of operations performed by the recovery process is to ensure that the distributed file system is in a consistent state once the recovery process is complete. However, some of the operations could be performed irrespective of the ordering, and thus could be performed concurrently or in parallel with other operations. Performing the recover process according to the strict serial ordering needlessly increases the time to perform the recovery process, thus increasing client downtime.

The techniques provided herein speed up and improve the efficiency of the recovery process by identifying certain operations that can be performed without a strict ordering requirement such that the operations can be performed concurrently or in parallel with other operations. Reducing the time to perform the recovery process reduces client downtime where clients are otherwise unable to access client data until the recovery process completes. This enables the ability to provide clients with improved/shorter recovery time objectives (RTOs) relating to a maximum tolerable length of time that a system can be down after a failure.

As part of identifying operations that can be performed without a strict ordering requirement, log structures within the persistent memory of the node are grouped into different groups based upon processing states of the log structures. A log structure has a first processing state (an active state) if I/O operations within the log structure have not yet been processed by a consistency point operation to update file system metadata with metadata of the I/O operations and data of the I/O operations has not been stored to the distributed storage. A log structure has a second processing state (a stale state) if I/O operation within the log structure have been partially processed where a consistency point operation updated file system metadata with metadata of the I/O operations but has not yet stored data of the I/O operations to the distributed storage.

As part of rebuilding the in-memory structures in the volatile memory, a first set of log structures having the first processing state (the active state) are identified. Because the first set of log structures have not yet been processed by a consistency point operation, a first set of in-memory representations are to be rebuilt in the volatile memory for the first set of log structures and replayed according to ordering values assigned to I/O operations within the first set of log structures. The ordering of the ordering values is maintained so that the file system metadata is placed into a consistent state. In contrast, a second set of log structures having the second processing state (the stale state) are identified. Because the file system metadata has already been updated with metadata of I/O operations logged within the second set of log structures, a second set of in-memory representations can be rebuilt in the volatile memory for the second set of log structures and replay irrespective of ordering values assigned to the I/O operations of the second set of log structures. The ordering of the ordering values does not need to be maintained and the second set of log structures can be replayed in any order because the file system metadata is already in a consistent state and has been updated with metadata in the second set of log structures. Thus, rebuilding the second set of in-memory representations and/or executing the second set of log structures can be done in any order, such as in parallel with respect to one another, and can be done in parallel with other operations such as rebuilding the first set of in-memory representations and/or executing the first set of log structures.

The rebuild process is faster and more efficient than conventional rebuild processes because operations relating to the second set of log structures can be performed in any order, such as concurrently and/or in parallel with respect to one another and/or with respect to other operations being performed by the recovery process. As in-memory representations are rebuilt within the volatile memory, the in-memory representations can be used by a replay operation to replay the corresponding log structures to update the file system metadata and/or store data of the logged I/O operations to the distributed storage. Once the replay operation and recovery process are complete, the node can start processing client I/O operations.

Other operations may also be performed concurrently and/or in parallel with the rebuild process and/or the replay operation. In some embodiments of concurrent operations, the key value map used to locate data of logged I/O operations stored within the persistent memory may have been lost from the volatile memory due to the failure. Accordingly, the log structures within the persistent memory may be processed to identify storage locations of the log structures and I/O operations logged therein for rebuilding the key value map in the volatile memory using the storage locations. The key value map may be rebuilt concurrently and/or in parallel with the rebuild process and/or the replay operation. In addition, the log structures can be concurrently processed in order to rebuild the key value map.

In some embodiments of concurrent operations, replay of the log structures within the persistent memory may be performed in parallel with other replay operations performed by the node, such as a file system replay of a file system log. The file system replay may be performed to rebuild configuration information maintained by a local file system of the node for a local volume. In some embodiments of concurrent operations, I/O operations that do not overlap in the distributed file system and do not have dependencies upon one another can be concurrently replayed (e.g., I/O operations targeting different files). In some embodiments of concurrent operations, log structures used by different services of the node can be concurrently replayed. In some embodiments of concurrent operations, log structures may be grouped together as a collection that can be rebuilt and/or replayed in parallel. In this way, certain operations performed by the recovery process can be performed concurrently and/or in parallel in order to speed up the recovery process, reduce client downtime, and satisfy stringent recovery time objects (RTOs).

In addition, various embodiments of the present technology provide for a wide range of technical effects, advantages, and/or improvements to computing systems and components. For example, various embodiments may include one or more of the following technical effects, advantages, and/or improvements: 1) improving the efficiency of a recovery process performed by a node to recover from a failure; 2) reducing the time to perform the recovery process in order to reduce client downtime and provide clients with improved/low recovery time objectives (RTOs); 3) concurrently processing log structures of logged I/O operations to more efficiently rebuild a key value map used to locate data of the logged I/O operations; 4) concurrently rebuilding in-memory representations of log structures identified as stale log structures in order to more quickly rebuild the in-memory representations; 5) serially rebuilding in-memory representations of log structures identified as active log structures in order to maintain file system consistency and ordering semantics; 6) concurrently replaying the log structures of a persistent store while performing a file system log replay to rebuild configuration information maintained by a local file system of the node for a local volume; 7) independently rebuilding the key value map and the in-memory representations concurrently for different services of the node; 8) concurrently replaying active log structures identified as not having dependencies upon one another and being non-overlapping in the distributed file system; 9) rebuilding a collection of active log structures together and executing the collection of active log structures while rebuilding another collection of active log structures; 10) coalescing multiple logged I/O operation records targeting adjacent storage locations into a single file system message; and/or 11) currently replaying logged I/O operation records within a given collection based upon the logged I/O operation records targeting independent files having no dependencies.

In the following description, for the purposes of explanation, newer specific details are set forth in order to provide a thorough understanding of embodiments of the present technology. It will be apparent, however, to one skilled in the art that embodiments of the present technology may be practiced without some of the specific details. While, for convenience, embodiments of the present technology are described with reference to nodes, embodiments of the present technology are equally applicable to various other types of hardware, software, and/or storage.

The phrases "in some embodiments," "according to some embodiments," "in the embodiments shown," "in one embodiment," and the like generally mean the particular feature, structure or characteristic following the phrase is included in at least one implementation of the present technology, and may be included in more than one implementation period in addition such phrases do not necessarily refer to the same embodiment or different embodiments.

FIG. 1A is a block diagram illustrating an example of a distributed storage architecture 102 where I/O operations are logged into persistent memory 112 of a node in accordance with an embodiment of the present technology. The distributed storage architecture 102 provides clients with the ability to store data within persistent storage 120. The persistent storage 120 may be implemented as distributed storage accessible to a plurality of nodes of the distributed storage architecture 102. A node (e.g., a machine or virtual machine that runs containerized applications and other workloads) of the distributed storage architecture 102 processes I/O operations 104 directed to the distributed storage. The node processes the I/O operations 104 to store data 122 within or retrieve the data 122 from storage devices of the distributed storage. The data 122 may be accessible to the nodes of the distributed storage architecture 102. It may be appreciated that further details of a node of the distributed storage architecture 102 will be subsequently described in relation to FIGS. 7 and 8, among other places.

The node may include volatile memory 106, persistent memory 112, and/or local storage 116 that may be separate from the persistent storage 120 (distributed storage) of the distributed storage architecture 102. File system metadata 118 of a distributed file system of the distributed storage architecture 102 is stored within the local storage 116. The file system metadata 118 may include file modify times, file create times, file access times, file names, file sizes, directory names, access permissions, backup information, and/or a variety of other information relating to the distributed file system. The file system metadata 118 may be updated when an I/O operation is executed, such as where the name or size of a file is modified, a directory is created or deleted, etc. The node may implement journaling where the I/O operations 104 are initially logged into the persistent memory 112 as logged I/O operations 114. Once an I/O operation from a client has been logged, the node responds back to the client that the logged I/O operation was successfully completed. In this way, logged I/O operations 114 are responded back to clients as successful before the file system metadata 118 is updated with metadata of the logged I/O operations 114 and data of the logged I/O operations 114 is stored to the persistent storage 120 of the distributed storage architecture 102. In some embodiments, the logged I/O operations 114 may be stored within log structures of a persistent store (e.g., a persistent key value store) hosted within the persistent memory 112, which is further described in conjunction with FIGS. 3A-3C. In some embodiments, the persistent memory 112 may comprise non-volatile random access memory (NVRAM) different than the volatile memory 106, the local storage 116, and the persistent storage 120.

The node also maintains certain information within the volatile memory 106 that is used for logging the I/O operations 104, locating data of the logged I/O operation 114, and/or replaying the logged I/O operations 114 (e.g., replay as part of a consistency point operation or during a recovery process). An I/O log 108 may be used within the volatile memory 106 to store in-memory representations of the log structures within which the logged I/O operations 114 are stored. Because the logged I/O operations 114 are stored as raw/persisted data in the log structures with no organization or structure (e.g., raw data stored in physical blocks of the persistent memory 112), an in-memory representation of each log structure is maintained within the volatile memory 106 in order to organize, structure, and/or validate the log structures. The node also maintains a key value map 110 within the volatile memory 106. The key value map 110 comprises key value entries used to locate data of the logged I/O operations 114 stored within the log structures in the persistent memory 112. A key value entry may be a key value pair where a key of a logged I/O operation is paired with a value. The key can be used to query the key value map 110 to identify the value paired with the key of the logged I/O operation. The value is an offset within the persistent memory 112 where data of a logged I/O operation is stored.

The node implements consistency points in order to replay the logged I/O operations 114 within the persistent memory 112 using the in-memory representations in the I/O log 108 and the key value map 110. The log structures are processed during a consistency point in order to update the file system metadata 118 with metadata of the logged I/O operations 114 and store data of the logged I/O operations 114 to the persistent storage 120. During the consistency point, a log structure can have various processing states. Initially, the log structure may have a first processing state indicating that the file system metadata 118 has not yet been updated with metadata of logged I/O operations within the log structure and data of the logged I/O operations has not been stored to the persistent storage 120. When the file system metadata 118 has been updated with metadata of logged I/O operations within a log structure, then the log structure may be transitioned to a second processing state where merely the data of the logged I/O operations within the log structure is to be stored to the persistent storage 120. Once the data of the logged I/O operations within the log structure is stored to the persistent storage 120, then the log structure may be transitioned to a third processing state. While in the third processing state, storage within the persistent memory 112 used to store the log structure can be reclaimed/freed once a response has been received that the data was successfully stored within the persistent storage 120. Additionally, key value entries within the key value map 110 for the logged I/O operations can be removed, and an in-memory structure for the log structure with the third processing state can be removed from the I/O log 108. The processing states of the log structure may be identified by evaluating a consistency point count field associated with the log structure, which is populated with a most recently performed consistency point for the log structure. The consistency point count field for a log structure may be tracked as a consistency point count that is incremented after a consistency point operation completes the update of the file system metadata 118 with the metadata of the logged I/O operations within the log structure.

As used herein, a log structure having the first processing state may be referred to as an active log structure, and a log structure having the second processing state may be referred to as a stale log structure. The node may actively log incoming I/O operations into active log structures, but does not log incoming I/O operations into stale log structures.

Figure 1B:
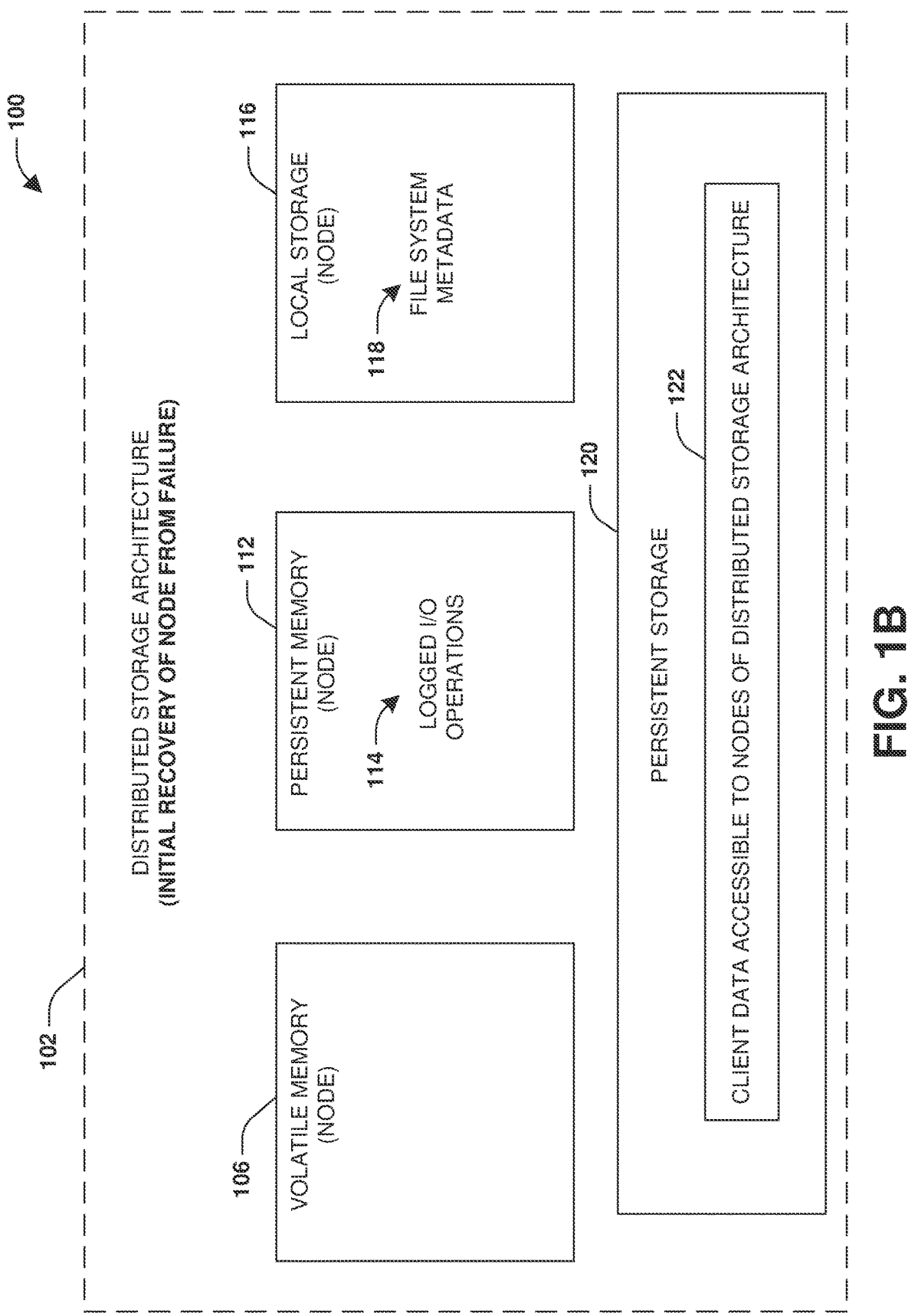
FIG. 1B is a block diagram illustrating an example of a distributed storage architecture where a node initially recovers from a failure in accordance with an embodiment of the present technology.

If the node experiences a failure during the consistency point operation (e.g., the distributed file system fails), then log structures of the persistent store within the persistent memory 112 may have various processing states. An initial recovery of the node is illustrated by FIG. 1B, which is a block diagram illustrating an example of the distributed storage architecture 102 where the node initially recovers from the failure in accordance with an embodiment of the present technology. After the failure, the logged I/O operations 114 may still be stored within the log structures of the persistent store in the persistent memory 112 due to the persistent nature of the persistent memory 112. Also, the file system metadata 118 may still be stored within the local storage 116 of the node. However, the in-memory representations in the I/O log 108 and the key value map 110 may be no longer in the volatile memory 106 due to the volatile nature of the volatile memory 106. Accordingly, as provided herein, a recovery process is performed to rebuild the in-memory representations and the key value map 110, which are used to replay the logged I/O operations within the log structures of the persistent store in the persistent memory 112.

Figure 1C:
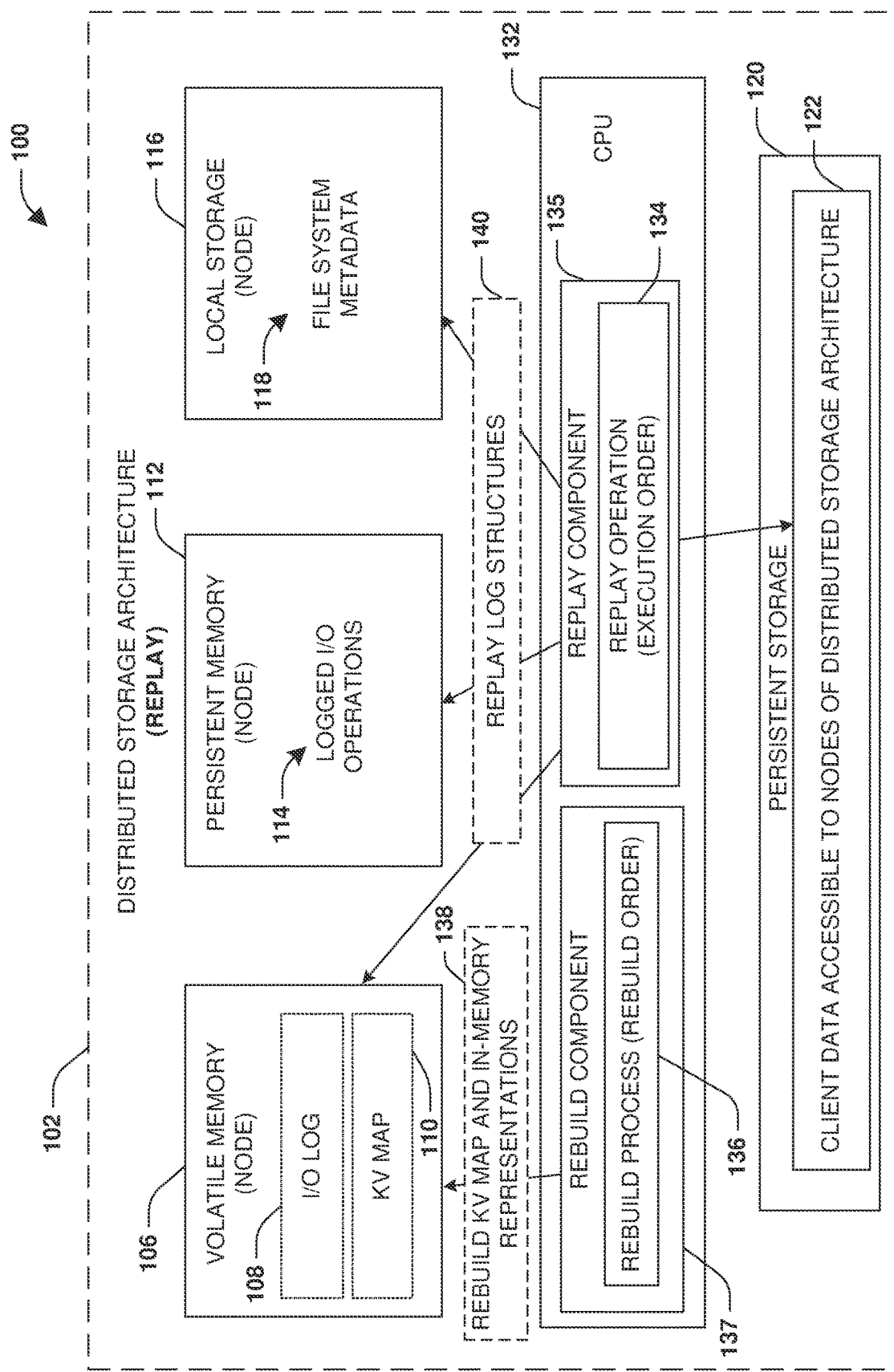
FIG. 1C is a block diagram illustrating an example of a distributed storage architecture where a rebuild process and a replay operation are performed during recovery of a node in accordance with an embodiment of the present technology.

The recovery process includes a rebuild process 136 implemented by a rebuild component 137 and replay operation 134 implemented by a replay component 135 illustrated by FIG. 1C, which is a block diagram illustrating an example of the distributed storage architecture 102 where the rebuild process 136 and the replay operation 134 are performed during recovery of the node in accordance with an embodiment of the present technology. The rebuild process 136 and/or the replay operation 134 may be executed by a processor 132 of the node, and are used to perform the recovery process. The rebuild process 136 is executed to rebuild 138 the key value map 110 and the in-memory representation in the I/O log 108 in the volatile memory 106.

In some embodiments of the rebuild process 136 rebuilding the key value map 110, the rebuild process 136 implements key value map reconstruction to reconstruct the key value map 110 with key value entries. The key value map reconstruction rebuilds the key value entries using information identified from the log structures within the persistent memory 112. The information may relate to offsets of where data of logged I/O operations are stored within the persistent memory 112 and/or keys (or other identifiers) of the logged I/O operations 114. In some embodiments, the key value map reconstruction processes log structures having the second processing state (stale log structures) in parallel for reconstructing key value entries within the key value map 110. In some embodiments, different services of the node (e.g., different slice services) may be associated with different log structures, and thus key value entries can be reconstructed by the key value map reconstruction in parallel for log structures corresponding to different services. It may be appreciated that various services hosted by the node are further described in relation to FIG. 7, such as a block service, a slice service, storage services, etc. In some embodiments, the key value map reconstruction may be performed in parallel with the rebuilding of the in-memory representations in the I/O log 108.

As part of implementing the rebuild process 136 to rebuild 138 to in-memory representations of the log structures within which the logged I/O operations 114 are logged, log structures are grouped based upon processing states of the log structures. A log structure may be identified as having a first processing state (an active log structure) based upon a determination that the consistency point operation did not update the file system metadata 118 with metadata of logged I/O operations logged within the log structure and did not store data of the logged I/O operations to the persistent storage 120. A log structure may be identified as having a second processing state (a stale log structure) based upon a determination that the consistency point operation updated the file system metadata 118 with metadata of logged I/O operations logged within the log structure, but did not store data of the logged I/O operations to the persistent storage 120.

In some embodiments of identifying whether a log structure has the first processing state or the second processing state, the determination is made by comparing consistency point information. In particular, the node may assign incrementing numerical values for each consistency point operation that is executed to update the file system metadata 118 (e.g., a consistency point value of 1 for a first consistency point operation, a consistency point value of 2 for a second consistency point operation, etc.). The node may maintain a latest consistency point value of a latest consistency point operation that was performed, which may be stored as a latest consistency point count. When a consistency point operation updates the file system metadata with metadata stored in a log structure, a consistency point value of the consistency point operation is stored within metadata associated with the log structure, which may be stored as a consistency point count. To determine if the log structure has the first processing state or the second processing state, a consistency point value stored within the metadata associated with the log structure (e.g., the consistency point count) is compared to a latest consistency point value (e.g., the latest consistency point count). If the consistency point value is less than the latest consistency point value, then the latest consistency point operation did not update the file system metadata 118 with the metadata in the log structure, and thus the log structure has the first processing state. If the consistency point values match, then the latest consistency point operation updated the file system metadata 118 with the metadata in the log structure, and thus the log structure has the second processing state. In this way, a first set of log structures (active log structures) are grouped into a first group based upon the first set of log structures having the first processing state. A second set of log structures (stale log structures) are grouped into a second group based upon the second set of log structures having the second processing state.

A rebuild order is determined based upon the processing states of the log structures. The rebuild order may specify an order with which in-memory representations of log structures are to be rebuilt within the volatile memory 106 based upon the processing states of the log structures. The rebuild order may be determined based upon the ordering values (e.g., non-volatile write index values) that were assigned to the logged I/O operations 114 according to an order with which the logged I/O operation 114 were received and/or logged into the log structures. Taking into account the ordering values ensures that the distributed file system will be in a consistent state after the recovery process. However, serially processing each logged I/O operation according to the ordering values is time consuming and inefficient. In order to improve the speed and efficiency of performing the recovery process, certain logged I/O operations can be processed irrespective of the ordering values, and thus certain operations of the recovery process can be performed in parallel or concurrently with other operations. In particular, the second set of log structures (stale log structures) can be rebuilt irrespective of the ordering values because metadata within the second set of log structures was already used by the consistency point operation before the failure to update the file system metadata 118. Thus, the file system metadata 118 is consistent with respect to the logged I/O operations within the second set of log structures. However, the first set of log structures (active log structures) are to be rebuilt according to the ordering values because metadata within the first set of log structures has not yet been used to update the file system metadata 118. Accordingly, the rebuild order may specify an order with which in-memory representations for the first set of log structures are to be rebuilt within the volatile memory 106 based upon ordering values assigned to logged I/O operations within the first set of log structures. Also, in-memory representations for the second set of log structures can be rebuilt within the volatile memory 106 irrespective of the rebuild order and ordering values.

Once the rebuild order has been determined by the rebuild process 136, the rebuilt process 136 rebuilds the in-memory representations of the log structures. In-memory representations for the first set of log structures are rebuilt within the volatile memory 106 according to the rebuild order (e.g., according to the non-volatile write index values assigned to the logged I/O operations within the first set of log structures). In-memory representations for the second set of log structures are rebuilt within the volatile memory 106 irrespective of the rebuild order. Thus, in-memory representations for log structures (stale log structures) of the second set of log structures can be rebuilt in parallel with respect to one another and/or in parallel with respect to the in-memory representations of the first set of log structures being rebuilt according to the rebuild order. In this way, in-memory representations of stale log structures having the second processing state can be rebuilt in parallel with respect to one another, and can be rebuilt independent of and/or in parallel with the serial rebuilding of the in-memory representations of the active log structures having the first processing state.

In some embodiments, a first in-memory representation and a second in-memory representation (e.g., in-memory representations of active log structures having the first processing state) may be rebuilt in parallel based upon the first in-memory representation and the second in-memory representation corresponding to log structures of logged I/O operations that are non-overlapping within the distributed file system and have no dependencies with respect to one another. In some embodiments, if the first in-memory representation is being rebuilt for a first log structure with logged I/O operations targeting certain files and directories and the second in-memory representation is being rebuilt for a second log structure with logged I/O operations targeting different (non-overlapping) files and directories, then the in-memory representations can be rebuilt in parallel.

In some embodiments, a first in-memory representation and a second in-memory representation (e.g., in-memory representations of active log structures having the first processing state) may be rebuilt in parallel based upon the in-memory representations corresponding to log structures of logged I/O operations comprising metadata used by different services. In some embodiments, if the first in-memory representation is being rebuilt for a first log structure with logged I/O operations with metadata used by a first slice service of the node and the second in-memory representation is being rebuilt for a second log structure with logged I/O operations with metadata used by a second slice service of the node (and no metadata used by the first slice service), then the in-memory representations can be rebuilt in parallel. In this way, in-memory representations of the log structures in the persistent store of the persistent memory 112 are rebuilt within the volatile memory 106 as the I/O log 108.

The replay operation 134 may be performed to replay 140 (e.g., execute) the logged I/O operations 114 within the log structures in the persistent memory 112 using the key value map 110 to identify storage locations of data of the logged I/O operations and using the in-memory representation to define the organization and structure of the log structures and logged I/O operations 114 that are otherwise stored as raw data within the persistent memory 112. The replay operation 134 replays active log structures having the first processing state by updating the file system metadata 118 with metadata of logged I/O operations within the active log structures. The replay operation 134 stores data of the logged I/O operations within the active log structures to the persistent storage 120. The replay operation 134 stores data of logged I/O operations within the stale log structures having the second processing state to the persistent storage 120 since the metadata of these logged I/O operations was already used to update the file system metadata 118 by the consistency point operation performed before the failure. In some embodiments, the replay operation 134 uses the key value map 110 for locating data of the logged I/O operations being replayed.

In some embodiments of performing the replay operation 134, the in-memory representations are used to replay 140 the log structures according to an execution order for updating the file system metadata 118 of the distributed file system with metadata of the log structures and for persisting data of the I/O operations to the persistent storage 120. The execution order may be defined based upon the processing states of the log structures and/or the ordering values (e.g., non-volatile write index values) assigned to the I/O operations. In some embodiments, the replay operation 134 utilizes the in-memory representations for stale log structures in order to replay logged I/O operations within the stale log structures in parallel. For a particular stale log structure, logged I/O operations are serially replayed in the order of ordering values assigned to the logged I/O operations.

In some embodiments of performing the replay operation 134, a set of in-memory representations may be identified as corresponding to log structures of logged I/O operations that target different files that are independent of one another. Accordingly, the set of in-memory representations may be utilized by the replay operation 134 in order to execute the logged I/O operations in parallel.

In some embodiments of performing the replay operation 134, a set of I/O operations that target contiguous blocks in a file may be coalesced together into a single file system message. The single file system message is executed by the distributed file system, such as for updating the file system metadata 118. Combining multiple I/O operations (e.g., 10 I/O operations) into a single file system message greatly improves the performance of the replay operation 134 (e.g., a 9× increase on execution time).

In some embodiments of implementing the rebuild process 136 and the replay operation 134, groups of in-memory representations may be rebuilt and/or replayed (executed) as collections of in-memory representations. The rebuild process 136 may serially rebuild collections of in-memory representations of the first set of in-memory representations for active log structures according to an ordering of the ordering values assigned to the I/O operations within the active log structures having the first processing state. The rebuild process 136 may rebuild collections of in-memory representations of the second set of in-memory representations for stale log structures having the second processing state in parallel. In some embodiments, the rebuild process 136 may rebuilt a collection of in-memory representations while the replay operation 134 replays one or more other collections of in-memory representations. In some embodiments, the replay operation 134 may execute logged I/O operations associated with a plurality of collections of in-memory representations in parallel.

In some embodiments, multiple active log structures may be combined into a combined log structure according to an ordering defined by the ordering values (non-volatile write index blues) assigned to the I/O operations within the active log structures. Batches of logged I/O operations within the combined log structure are serially processed for rebuilding in-memory representations of active log structures. Batches of logged I/O operations within the combined log structure are processed in parallel for rebuilding in-memory representations of stale log structures, along with executing other batches of logged I/O operations. Multiple batches of logged I/O operations associated with active log structures and/or stale log structures may be executed in parallel by the replay operation 134.

In some embodiments of performing the rebuild process 136 and/or the replay operation 134, a file system log replay of a file system log (e.g., a non-volatile log (NV Log)) for a local file system of the node may be performed in parallel with the rebuild process 136 and/or the replay operation 134. The file system log replay may be performed by the local file system to rebuild configuration information maintained by the local file system for a local volume that is separate from the persistent storage 120. The local volume may be stored within the local storage 116 of the node. The file system log replay may enforce a serial ordering for building the configuration information for a data set. The serial ordering may be different than the rebuild order of the rebuild process 136 and/or the execution order of the replay operation 134. In this way, various operations of the recovery process may be selectively performed in parallel to reduce the time to complete the recovery process and downtime experienced by clients.

Figure 2A:
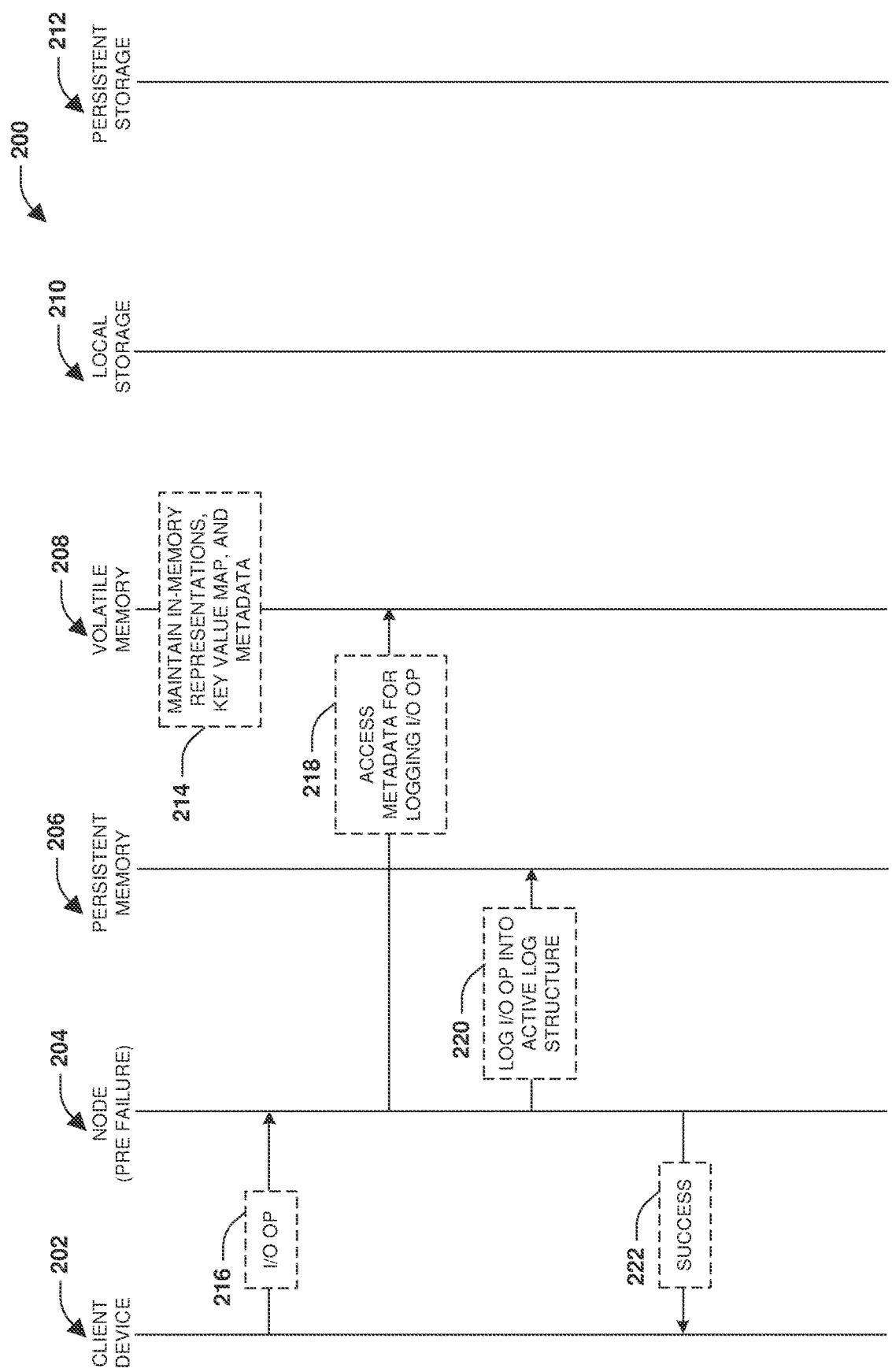
FIG. 2A is a sequence diagram illustrating an example of a set of operations for logging an I/O operation in accordance with various embodiments of the present technology.

FIG. 2A is a sequence diagram 200 illustrating an example of a set of operations for logging an I/O operation in accordance with various embodiments of the present technology. A node 204 may comprise persistent memory 206 within which I/O operations are logged into log structures of a persistent store. The node 204 may comprise volatile memory 208 used by the node 204 to maintain 214 a key value map, in-memory representations used to represent the organization and structure of the log structures, and/or other metadata for logging and replaying the logged I/O operation. The node 204 may comprise local storage 210 within which file system metadata of a distributed file system is maintained. The distributed file system may be implemented by the node 204 and/or other nodes of a distributed storage architecture where data is stored within persistent storage 212 (e.g., distributed storage comprised of storage devices accessible to the nodes of the distributed storage architecture). The node 204 may be configured to process I/O operations received from client devices and targeting the distributed file system.

In some embodiments, the node 204 may receive an I/O operation 216 from a client device 202. The I/O operation 216 may target the distributed file system, such as where the I/O operation 216 is a write operation to write data to a file of the distributed file system. The node 204 may access 218 the metadata within the volatile memory 208. The metadata may be used for logging the I/O operation into an active log structure within the persistent store of the persistent memory 206. The metadata information may identify into which active log structure the I/O operation 216 should be logged (e.g., the I/O operation 216 may be being processed by a CPU assigned to that particular active log structure), the location of the active log structure within the persistent store of the persistent memory 206, and/or other information used for logging the I/O operation 216. In this way, the node 204 utilizes the metadata to log 220 the I/O operation 216 into the active log structure. The node 204 may return a success message 222 to the client device 202 once the I/O operation 216 is logged into the active log structure even though the I/O operation 216 has not yet been executed to update the distributed file system with metadata of the I/O operation 216 and data of the I/O operation 216 has not been stored to the persistent storage 212.

Figure 2B:
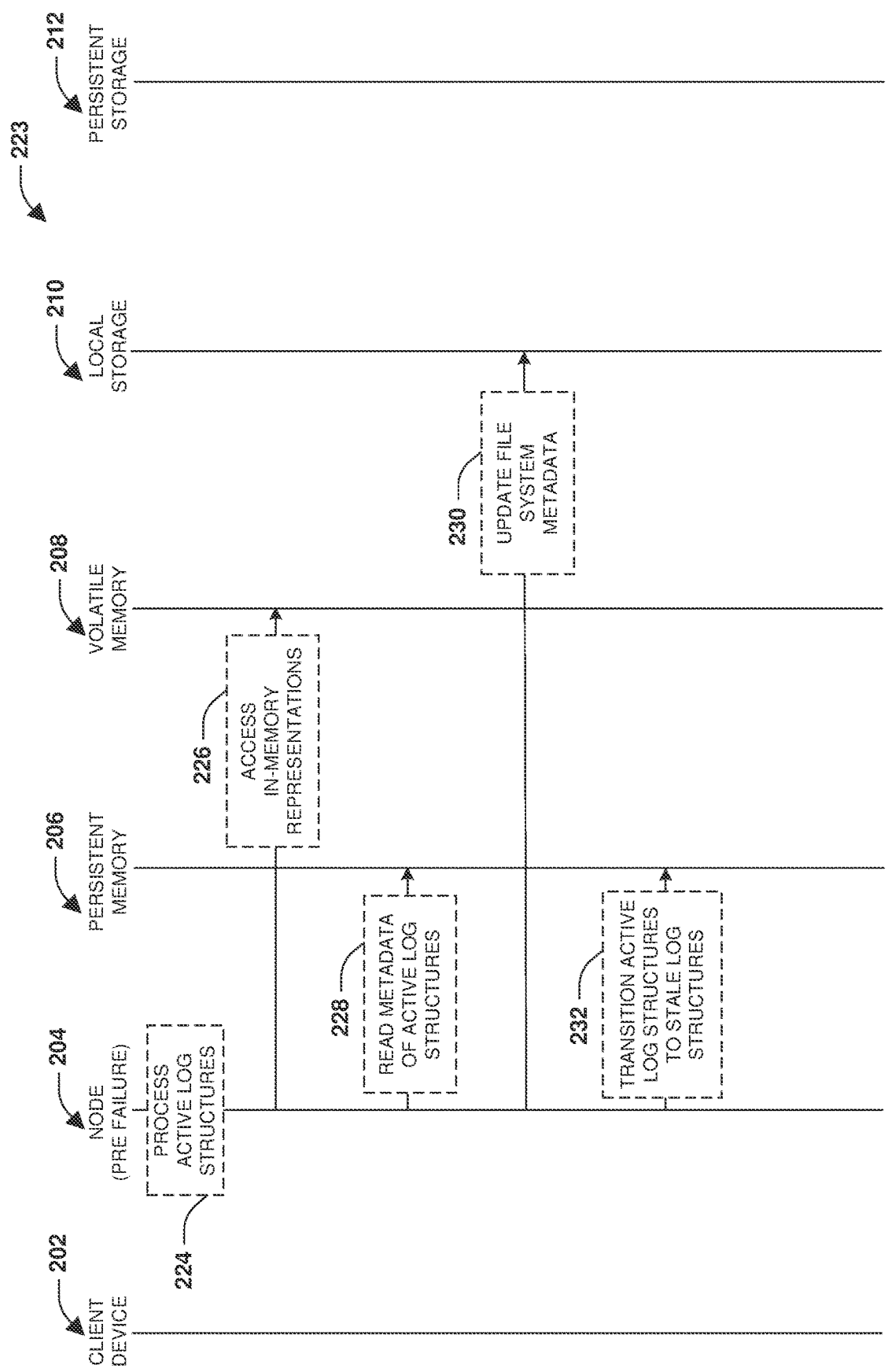
FIG. 2B is a sequence diagram illustrating an example of a set of operations for performing a consistency point operation to update file system metadata in accordance with various embodiments of the present technology.

FIG. 2B is a sequence diagram 223 illustrating an example of a set of operations for performing a consistency point operation to update file system metadata in accordance with various embodiments of the present technology. The node 204 may determine that the consistency point operation is to be performed based upon a time since a prior consistency point operation was performed, a threshold number of I/O operations being logged, an amount of free space of an active log structure (e.g., 75% of storage space assigned to an active log structure has been consumed), etc. As part of performing the consistency point operation, the node processes 224 active log structures in order to update the file system metadata within the local storage 210 using metadata of I/O operations logged within the active log structures. The active log structures have a first processing state where the file system metadata has not been updated with metadata of I/O operations within the active log structures and data of the I/O operations has not been stored to the persistent storage 212. As part of processing the active log structures, the node accesses 226 the in-memory representations and/or the key value map within the volatile memory 208, which is used for identifying and processing the active log structures. In particular, the node 204 may utilize the in-memory representations to understand the structure and organization of the active log structures and may utilize the key value map to identify the storage locations of the active log structures. The node 204 reads 228 metadata of the I/O operations logged within the active log structures, and updates 230 the file system metadata within the local storage 210 using the metadata.

Once the file system metadata has been updated with the metadata of the active log structures, the active log structures are transitioned 232 to be stale log structures. The stale log structures have a second processing state where the file system metadata has been updated with the metadata of the I/O operations and data of the I/O operations has not been stored to the persistent storage 212. A latest consistency point value (e.g., a latest consistency point count tracked by the node 204) may be updated with a consistency point value of the consistency point operation (e.g., the consistency point operation may be a third consistency point operation performed, and thus has a consistency point value of 3). Consistency point count fields (e.g., consistency point counts) associated with the now stale log structures may also be set to the consistency point value of the consistency point operation.

FIG. 2C is a sequence diagram 233 illustrating an example of a set of operations for persisting data of logged I/O operation to persistent storage in accordance with various embodiments of the present technology. The node 204 may process 234 stale log structures having the second processing state in order to store data of logged I/O operations within the stale log structures to the persistent storage 212. In some embodiments, a stale log structure is identified based upon the stale log structure having consistency point count field with a value matching the latest consistently point value (e.g., consistency point counts of 3). Other log structures may be active log structures having consistency point count fields with values not matching the latest consistency point value. As part of processing the stale log structures, the node 204 may access 236 in-memory representations of the stale log structures and/or the key value map indicating storage locations of the stale log structures within the persistent memory 206. The node 204 may utilize the in-memory representations to understand the structure and organization of the stale log structures and may utilize the key value map to identify the storage locations of the stale log structures. In this way, the node 204 reads 238 the data of the active log structures from the persistent memory 206. The node 204 persists 240 the data of the stale log structures to the persistent storage 212. Once the node 204 receives a notification that data of a stale log structure has been successfully persisted to the persistent storage 212, storage space of the persistent memory 206 used to store the stale log structure may be reclaimed 242 and freed to store other data.

Figure 2D:
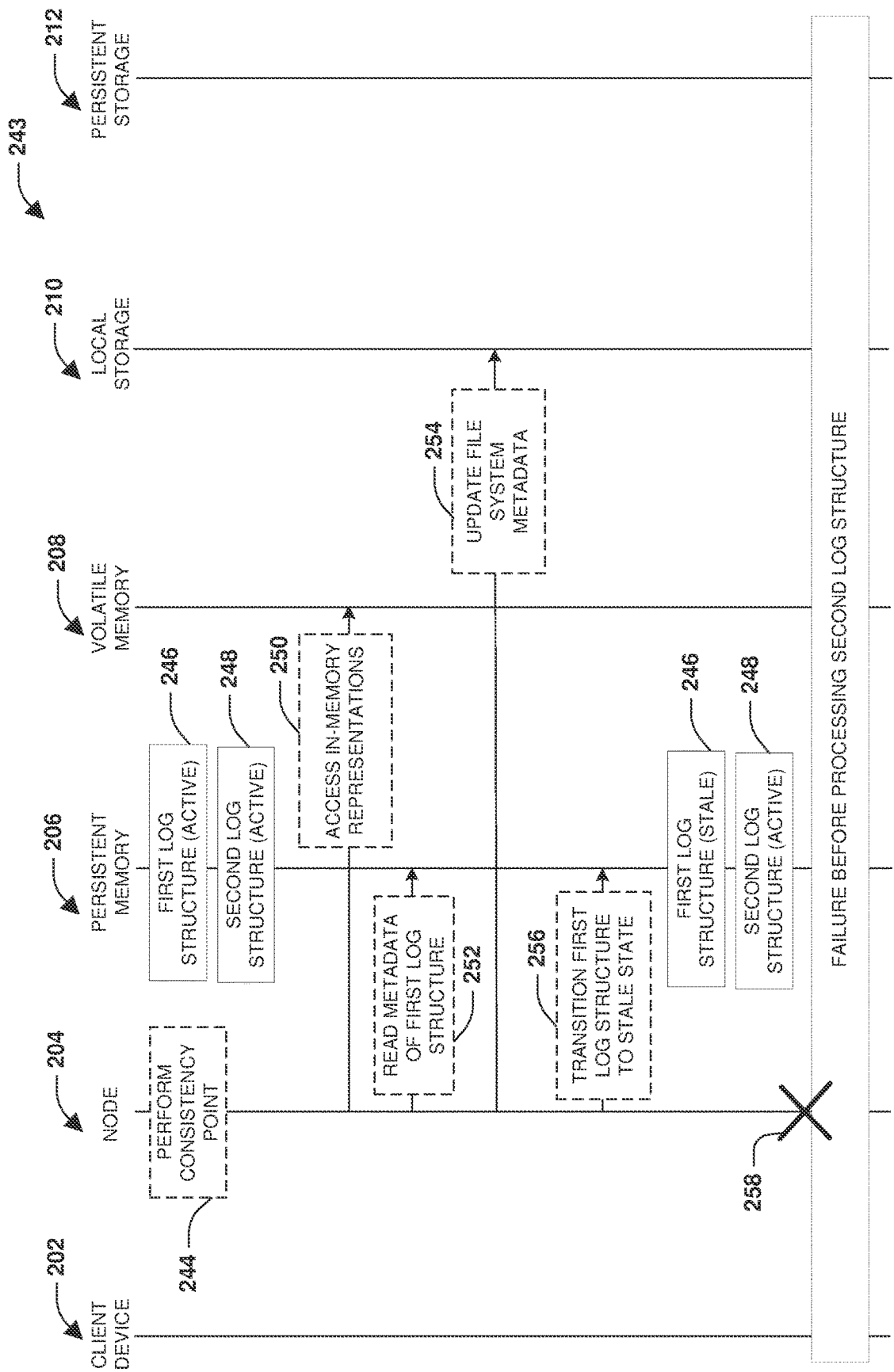
FIG. 2D is a sequence diagram illustrating an example of a set of operations for performing a consistency point operation where a node fails before completion of the consistency point operation in accordance with various embodiments of the present technology.

FIG. 2D is a sequence diagram 243 illustrating an example of a set of operations for performing a consistency point operation where a node fails before completion of the consistency point operation in accordance with various embodiments of the present technology. The node 204 may perform 244 a consistency point operation to update the file system metadata in the local storage 210 (e.g., a fourth consistency point operation assigned a consistency point value of 4). As part of performing the consistency point operation, a first log structure 246 may be identified as an active log structure having the first processing state. A second log structure 248 may be identified as an active log structure having the first processing state. In this way, active log structures with the first processing state and/or stale log structures with the second processing state are identified.

The node 204 accesses 250 in-memory representations of the log structures that are being processed by the consistency point operation. The node 204 uses an in-memory representation of the first log structure 246 to read 252 metadata of the first log structure 246 and update 254 the file system metadata with metadata of logged I/O operations within the first log structure 246. Once the file system metadata is updated, the first log structure 246 is transitioned 256 to be a stale log structure having the second processing state. At this point, the first log structure 246 is a stale log structure with the second processing state and the second log structure 248 is an active log structure with the first processing state. A failure 258 may occur before the second log structure 248 is processed by the consistency point operation to update the file system metadata with metadata of I/O operations logged within the second log structure 248. Because of the failure 258, the key value map and the in-memory representations within the volatile memory 208 are lost.

Figure 2E:
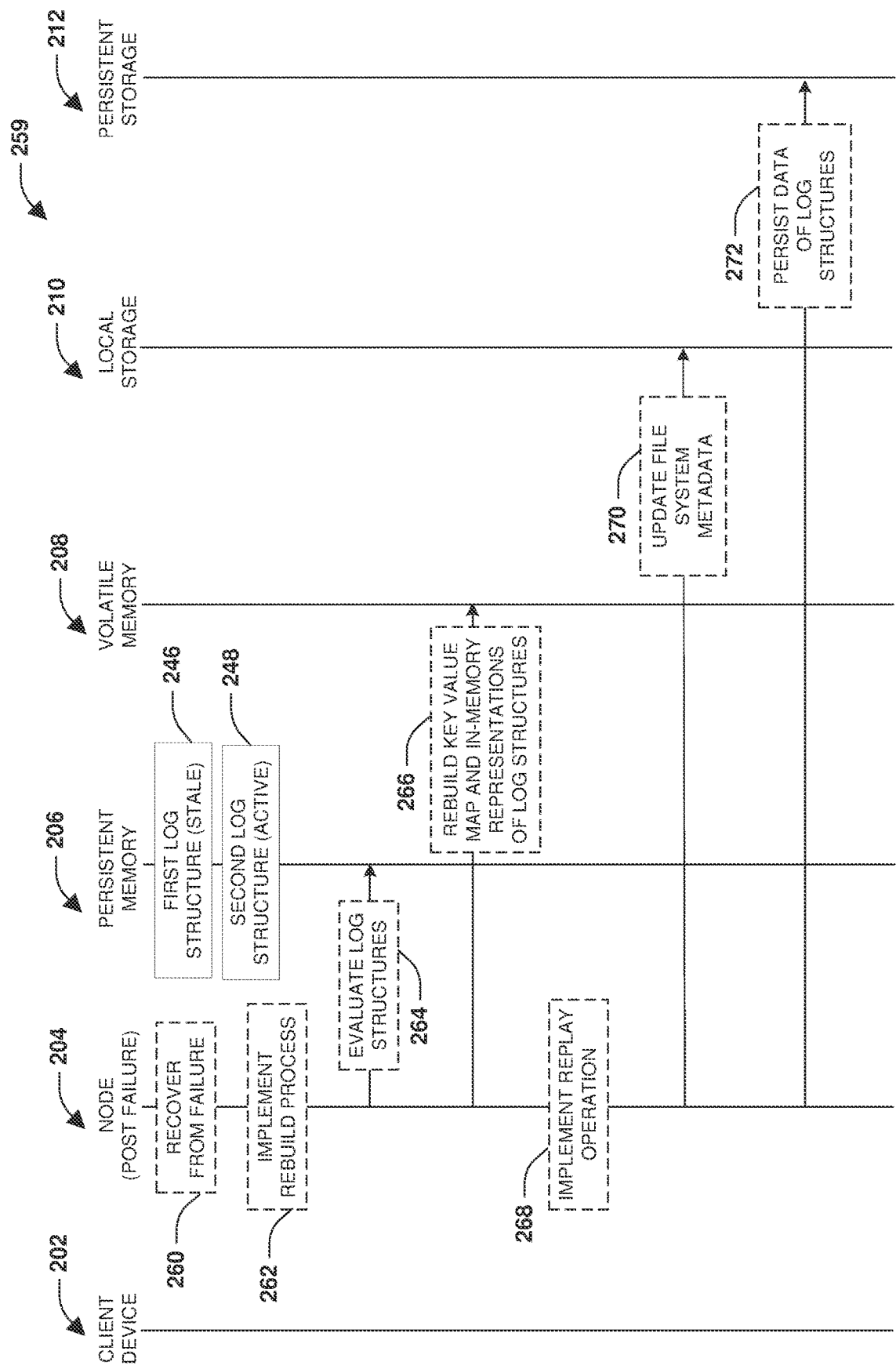
FIG. 2E is a sequence diagram illustrating an example of a set of operations for recovering from a failure by implementing a rebuild process and a replay operation in accordance with various embodiments of the present technology.

FIG. 2E is a sequence diagram 259 illustrating an example of a set of operations for recovering from a failure by implementing a rebuild process and replay operation in accordance with various embodiments of the present technology. The node 204 may initially recover 260 from the failure and execute a recovery process. The recovery process may implement 262 a rebuild process and may implement 268 a replay operation. The rebuild process may identify active log structures, such as the second log structure 248, having the first processing state. The rebuild process may identify stale log structures, such as the first log structure 246, having the second processing state. The node 204 may determine a rebuild order for rebuilding the in-memory representations of the active log structures and the stale log structures into the volatile memory 208. In this way, the node 204 evaluates 264 the active log structures and the stale log structures stored within the persistent memory 206 in order to rebuild 266 the in-memory representations in the volatile memory 208 according to the rebuild order.

In some embodiments, in-memory representations of the active log structures having the first processing state are rebuilt according to the rebuild order determined based upon ordering values (e.g., non-volatile write index values) assigned to the I/O operations logged within the active log structures. In-memory representations of the stale log structures having the second processing state are rebuilt irrespective of the rebuild order so that the in-memory representations can be rebuilt in parallel or concurrently with respect to one another and/or with respect to the in-memory representations of the active log structures being rebuilt within the volatile memory 208. The node 204 also rebuilds 266 the key value map within the volatile memory 208. In this way, the node 204 rebuilds 266 the key value map and the in-memory representations into the volatile memory 208 for use by the replay operation.

The node 204 may implement 268 the replay operation to replay the log structures using the key value map and the in-memory representations rebuilt within the volatile memory 208. As part of the replay operation, metadata of the logged I/O operations within the active log structures is used to update 270 the file system metadata of the distributed file system. Data of the logged I/O operations within the log structures is persisted 272 to the persistent storage 212. In this way, the recovery process may complete and the node 204 may start servicing I/O operations from the client device 202. It may be appreciated that further details of the rebuild process and/or the replay operation performed by the node 204 may include operations discussed in relation to FIGS. 1A-1C.

Figure 3A:
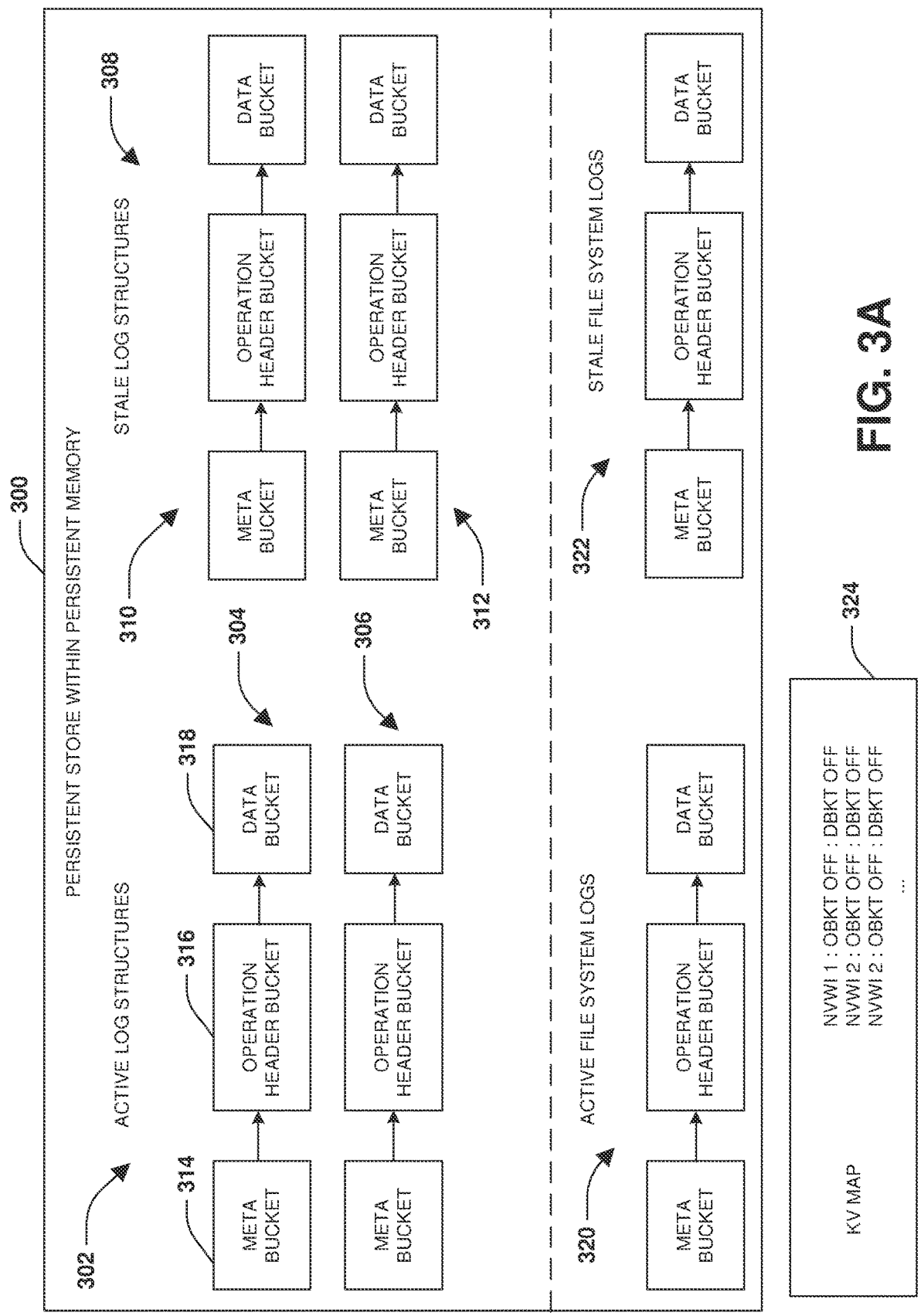
FIG. 3A is a block diagram illustrating an example of a persistent store and a key value map in accordance with various embodiments of the present technology.

FIG. 3A is a block diagram illustrating an example of a persistent store 300 and a key value map 324 in accordance with various embodiments of the present technology. In some embodiments, I/O operations are logged within log structures that are stored within the persistent store 300 within persistent memory of a node. In some embodiments, the persistent memory is non-volatile memory (NVRAM) and the persistent store 300 may be implemented as a non-volatile memory store (NVStore) that is stored in the NVRAM. In some embodiments, the persistent store 300 is implemented as a persistent key value store that stores key value records within log structures. In some embodiments, the persistent key value store may be used as a primary cache to process read and write operations from clients, and thus the NVStore is used as a journal and a persistent tier where data can reside for longer durations in order to service client read operations directly from the NVStore. When an I/O operation is received to write data to persistent storage of the distributed storage architecture, the I/O operation may be cached/logged as a key value record pair within a log structure of the persistent key value store. The key value record pair includes a key record of metadata of the I/O operation. The key value record pair includes a value record of the data of the I/O operation. The key value record may be cached/logged within an active log structure, such as a first active log structure 304. The metadata of the I/O operation may be stored as the metadata record within an operation header bucket 316 that points to a data bucket 318 of the first active log structure 304. The data of the I/O operation may be stored as the data record within the data bucket 318. A meta bucket 314 of the first active log structure 304 may be used to record bucket chain metadata as a pointer to the operation header bucket 316 that points to the data bucket 318. In this way, I/O operations may be stored within the buckets of the first active log structure 304.

In some embodiments, incoming I/O operations may be logged into active log structures 302 of the persistent store 300, such as the first active log structure 304 and a second active log structure 306 having a first processing state. In some embodiments, different CPUs or other services or components of the node may be assigned to a particular active log structure into which the CPU will log I/O operations. During a consistency point operation, metadata records (metadata of logged I/O operations) within operation header buckets and data records (data of logged I/O operations) within data buckets of the active log structures 302 is used to update file system metadata of a distributed file system. Once the file system metadata is updated using metadata within metadata records of operation header buckets of one or more active log structures, then the one or more active log structures are transitioned to be stale log structures 308, such as a first stale log structure 310 and a second stale log structure 312 having the second processing state. Metadata records within the operation header buckets of the stale log structures 308 has already been used to update the file system metadata, however, the data records within the data buckets of the stale log structures 308 have not yet been stored to persistent storage of the distributed storage architecture.

The node may maintain a local file system separate from the distributed file system. The local file system may be part of a local volume hosted by the node within local storage of the node. The node may log operations directed to the local file system into active file system logs 320. During a file system log replay, the node may replay the operations logged within the active file system logs 320 to update configuration information of the local file system. Once the local file system is updated, the active file system logs 320 are transitioned to be stale file system logs 322. As previously discussed, the file system log replay may be performed in parallel with the rebuild process and/or the replay operation used by the recovery process to replay the log structures within the persistent store 300.

A key value map 324 may also be stored within persistent memory of the node. The key value map 324 may comprise key value entries that are used to locate data of logged I/O operations within the log structures of the persistent store 300. A key value entry may map an ordering value (e.g., a non-volatile write index value (NVWI)) of a particular logged I/O operation to an offset of an operation header bucket within which metadata of the logged I/O operation is stored and to an offset a data bucket within which data of the logged I/O operation is stored. In order to locate the data of the I/O operation, the ordering value assigned to the I/O operation is used to query the key value map 324 in order to locate the offset of the operation header bucket and the offset of the data bucket within the persistent memory. The offsets can be used to access storage locations of the metadata and the data in the persistent memory.

Figure 3B:
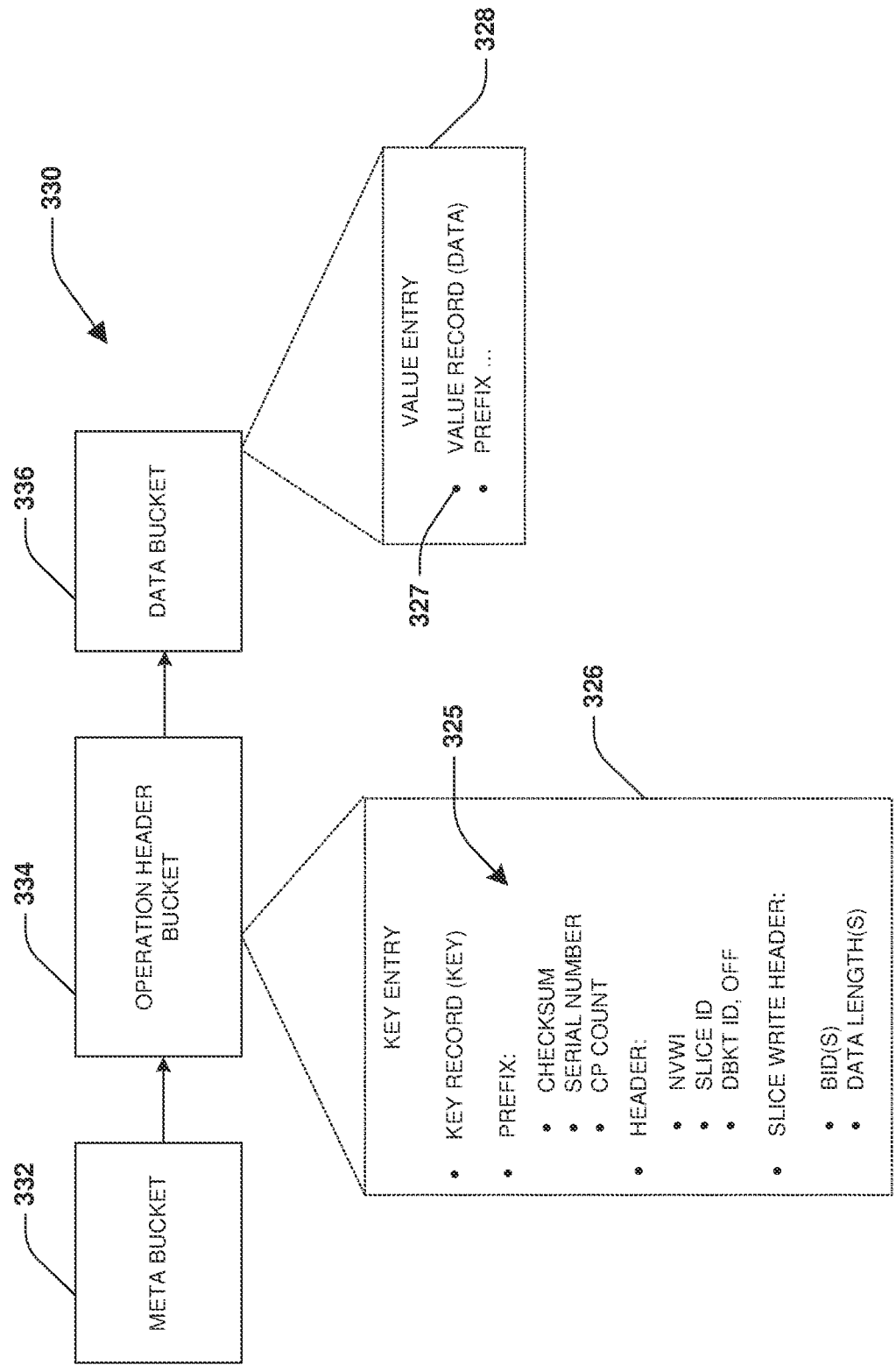
FIG. 3B is a block diagram illustrating an example of a log structure in accordance with various embodiments of the present technology.

FIG. 3B is a block diagram illustrating an example of a log structure 330 in accordance with various embodiments of the present technology. The log structure 330 may be assigned to a CPU of a node that will log I/O operations into the log structure 330. In some embodiments, the log structure 330 comprises a meta bucket 332, an operation header bucket 334, and a data bucket 336. The meta bucket 332 comprises bucket chain metadata used to point to the operation header bucket 334 that points to the data bucket 336. In this way, the meta bucket 332 is used as an entry point (e.g., similar to a root node of a tree structure) for the log structure 330. The structure and organization of the log structure 330, such as the meta bucket 332, the operation header bucket 334, the data bucket 336, and I/O operations logged therein, may be defined by an in-memory representation of the log structure 330 that may be stored in volatile memory of the node.

When an I/O operation is received by the node, the I/O operation may be logged as a key value pair within the log structure 330. Data of the I/O operation (e.g., a file, data being written to a volume, a blob of data, or any other type of data received by the node from a client for storage) may be stored as a value record 327 within a value entry 328 created within the data bucket 336 for the I/O operation. Metadata 325 of the I/O operation may be stored within a key entry 326 created within the operation header bucket 334 for the I/O operation.

Figure 3C:
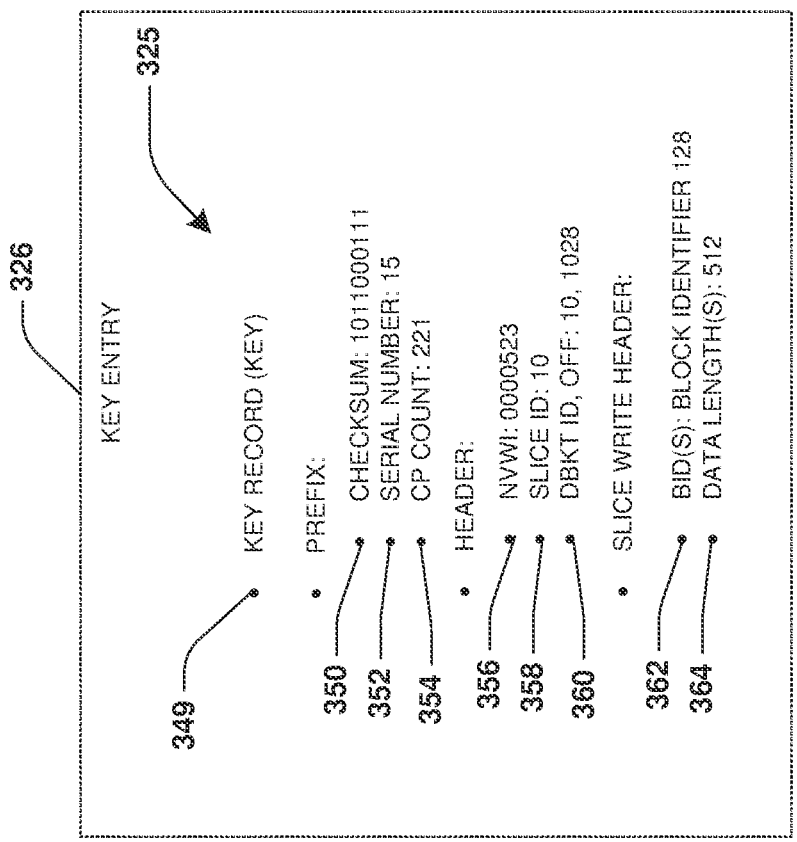
FIG. 3C is a block diagram illustrating an example of a key entry in accordance with various embodiments of the present technology.

An embodiment of the key entry 326 is illustrated by FIG. 3C, which is a block diagram illustrating an example of the key entry 326 in accordance with various embodiments of the present technology. The key entry 326 may include a key record 349 corresponding to a unique identifier for the value record 327 of the key value pair. In some embodiments, the value record 327 (e.g., data of the I/O operation) may be input into a hash function that creates a hash of the value record 327 as the unique identifier. Because the key record 349 is a unique identifier for the value record 327, the key record 349 may be used to reference and locate the value record 327. In this way, the key record 349 may be used to index the value record 327.

A prefix may be assigned to the key entry 326 and the value entry 328. In some embodiments, the same prefix may be assigned to both the key entry 326 and the value entry 328 so that prefix data of prefixes for the key entry 326 and the value entry 328 may be compared to validate the integrity of the key entry 326 and the value entry 328. The prefix may comprise prefix data. In some embodiments, the prefix data comprises a checksum 350 that may be used to validate the integrity of the key entry 326 and/or the value entry 328. In some embodiments, the node may implement checksum functionality that takes information within the key entry 326 and/or the value entry 328 as input, and outputs a checksum with a value of "1011000111" that can be used to verify the information within the key entry 326 and/or the value entry 328. In some embodiments, the prefix data comprises a serial number 352 with a value of "15" of an I/O operation that created the key value record pair. In some embodiments, monotonically increasing serial numbers may be assigned to I/O operations, such as the I/O operation that wrote the value record tracked by the key entry 326. In some embodiments, the node may assign the serial numbers as the I/O operations are received from the clients. Accordingly, the I/O operation may be assigned the serial number 352 with the value of "15" (e.g., the I/O operation may be the 15th I/O operation received), and thus the serial number 352 with the value of "15" may be included within the prefix data.

In some embodiments, the prefix data comprises a consistency point count field 354 with a value of "221" for a consistency point operation that processed the key value pair or of a consistency point operation that was most recently performed when the key value pair was created. The consistency point operation is assigned a consistency point value, such as a monotonically increasing number. In this way, the consistency point operation may be the $221^{st}$ consistency point operation performed. The consistency point count field 354 may be used to determine whether the log structure has a first processing state or a second processing state based upon whether the value of "221" within the consistency point count field 354 matches a current consistency point value of a latest consistency point operation that was performed.

The key entry 326 may also comprise a header. The header may be populated with a data bucket identifier and offset 360 used to point to the data bucket 336. In some embodiments, the value record 327 (e.g., data of the I/O operation) may be stored within the data bucket 336 having a data bucket identifier of "10", and may be stored at an offset of 1028. The header may be populated with a slice identifier 358 of a slice (a slice file) used by a slice service to track the value record 327. In some embodiments, the slice may be assigned the slice identifier 358 of "10", which may be used to locate the slice. The header may comprise an ordering value such as a non-volatile write index value (NVWI) 356 corresponding to a global sequentially incrementing record number of "0000523" for an I/O operation that wrote the value record 327 (e.g., wrote data of the I/O operation) of the key value record pair.

In some embodiments, non-volatile write index values (ordering values) may be assigned to key value record pairs. The non-volatile write index values may be global sequentially incrementing record numbers for PUT operations associated with the key value record pairs, which may be stored within key entries for the key value record pairs. The non-volatile write index values may be used to perform cross-chain validation and verification by determining whether there are any missing non-volatile write index values. Any missing non-volatile write index values may be indicative of missing key or value entries since the non-volatile write index values may be unique monotonically increasing numbers. The key entry 326 may also comprise a slice write header comprising block identifiers 362 of blocks storing the value record 327 and/or data lengths 364 of the blocks (e.g., a block having a length of 512 kb may store the value record).

Figure 4:
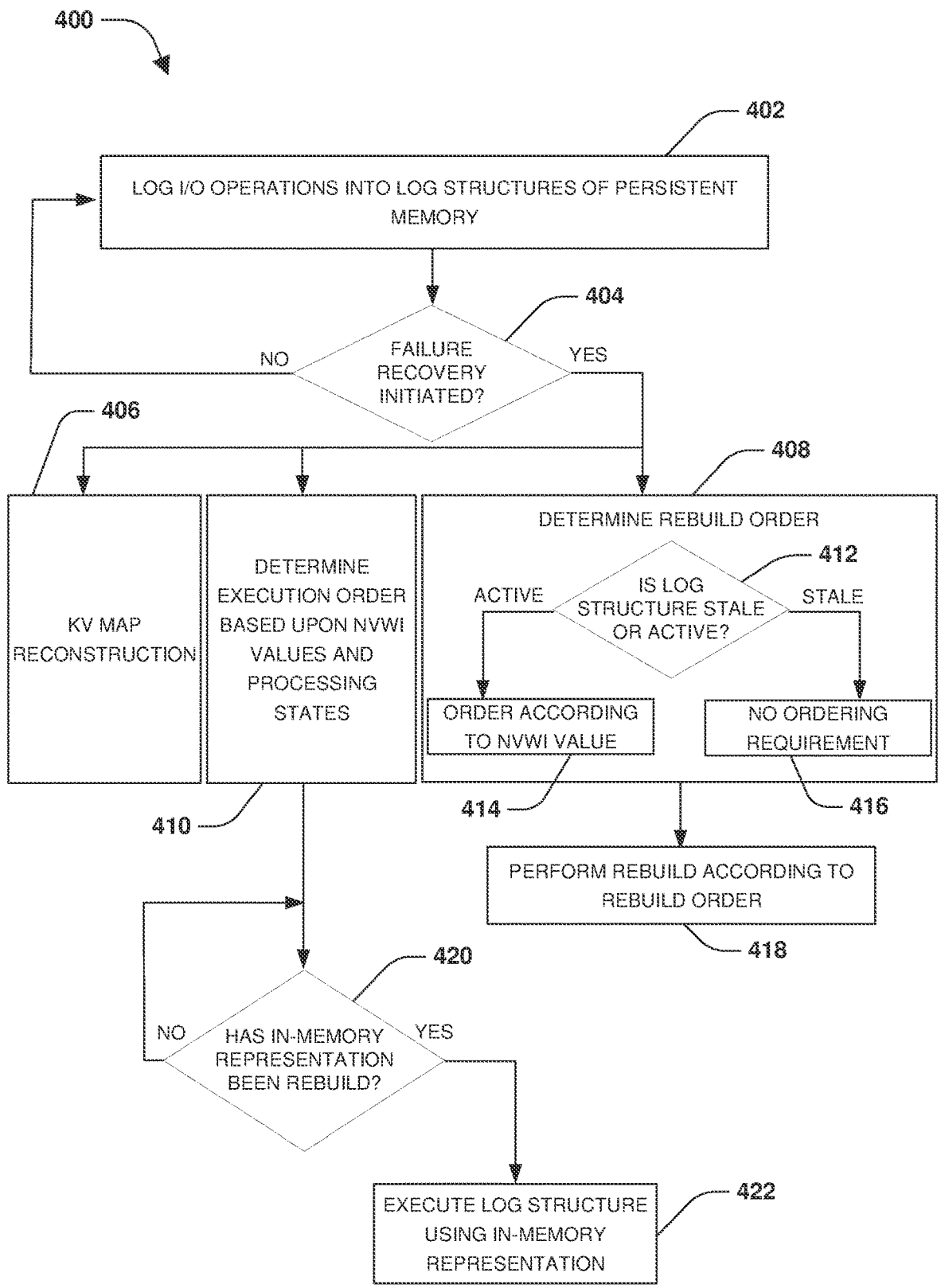
FIG. 4 is a flow chart illustrating an example of a set of operations of a method for recovering from a failure by rebuilding in-memory representations of log structures and executing the log structures using the in-memory representations in accordance with various embodiments of the present technology.

FIG. 4 is a flow chart illustrating an example of a set of operations of a method 400 for recovering from a failure by rebuilding in-memory representations of log structures and executing the log structures using the in-memory representations in accordance with various embodiments of the present technology. A node may provide client devices with access to a distributed file system hosted by nodes of a distributed storage architecture. Data of the distributed file system may be stored within persistent storage of the distributed storage architecture. The node may process I/O operations received from a client device and targeting the distributed file system. Instead of directly executing the I/O operations upon persistent storage of the distributed storage architecture, the node may log the I/O operations into log structures of persistent memory of the node, during operation 402 of method 400. Logging the I/O operations into the persistent memory is faster than executing the I/O operations to store data into the persistent storage of the distributed storage architecture, and thus the node can respond back to the client devices faster in order to reduce latency. During a consistency point operation, metadata of the logged I/O operations is used to update the distributed file system and/or store the data of the logged I/O operations to the distributed storage.

During operation 404, the node may determine whether failure recovery has been initiated. Failure recovery may be initiated based upon the node and/or distributed file system failing and initially rebooting/recovering from the failure. If failure recovery has not been initiated (e.g., there is no failure to recover from), then the node continues logging the I/O operations. If the failure recovery has been initiated, then the node implements a recovery process. As part of implementing the recovery process, the node performs a key value map reconstruction, during operation 406 of method 400. The key value map reconstruction may process the log structures within the persistent memory in order to rebuild the key value map. The key value map reconstruction may populate the key value map with key value entries. A key value entry for an I/O operation may include an ordering value (e.g., a non-volatile write index (NVWI) value used as a globally unique identifier for the I/O operation) mapped to an operation header bucket storing metadata of the I/O operation and a data bucket storing data of the I/O operation. In this way, the key value entry can be used to locate the data of the I/O operation stored in the persistent memory. In some embodiments, the key value map reconstruction may be performed in parallel with other operations performed by the recovery process.

As part of implementing the recovery process, a rebuild order may be determined, during operation 408 of method 400. The rebuild order may be used by a rebuild process in order to rebuild in-memory representations of I/O operations within the persistent memory. As part of determining the rebuild order for a particular log structure, a determination is made as to whether the log structure is an active log structure having a first processing state or a stale log structure having a second processing state, during operation 412 of method 400. If the log structure is determined to be an active log structure having the first processing state, then a designation is made within the rebuild order that an in-memory representation for the active log structure is to be ordered based upon non-volatile write index values of logged I/O operations within the active log structure, during operation 414 of method 400. If the log structure is determined to be a stale log structure having the second processing state, then a designation is made that the rebuilding of an in-memory representation for the stale log structure has no ordering requirement, during operation 416 of method 400. In this way, the in-memory representations are rebuilt within volatile memory of the node, during operation 418 of method 400. In some embodiments, in-memory representations of stale log structures are rebuilt irrespective of the rebuild order (e.g., in parallel with respect to one another and/or with respect to the rebuilding of in-memory representations of active log structures). In-memory representations of active log structures are rebuilt in an order defined by the rebuild order.

As part of implementing the recovery process, an execution order is determined, during operation 410 of method 400. The execution order may be determined based upon the non-volatile write index values of the logged I/O operations and/or the processing state of the log structures. During operation 420 of method 400, a determination is made as to whether an in-memory representation for a log structure has been rebuilt within the volatile memory. The determination may be made because the rebuild process that rebuilds the in-memory representations may be performed in parallel with a replay operation that replays the log structures by executing I/O operations according to the replay order. If an in-memory representation of a log structure has been rebuilt within the volatile memory, then the replay operation executes the log structure using the in-memory representation, during operation 422 of method 400.

Figure 5:
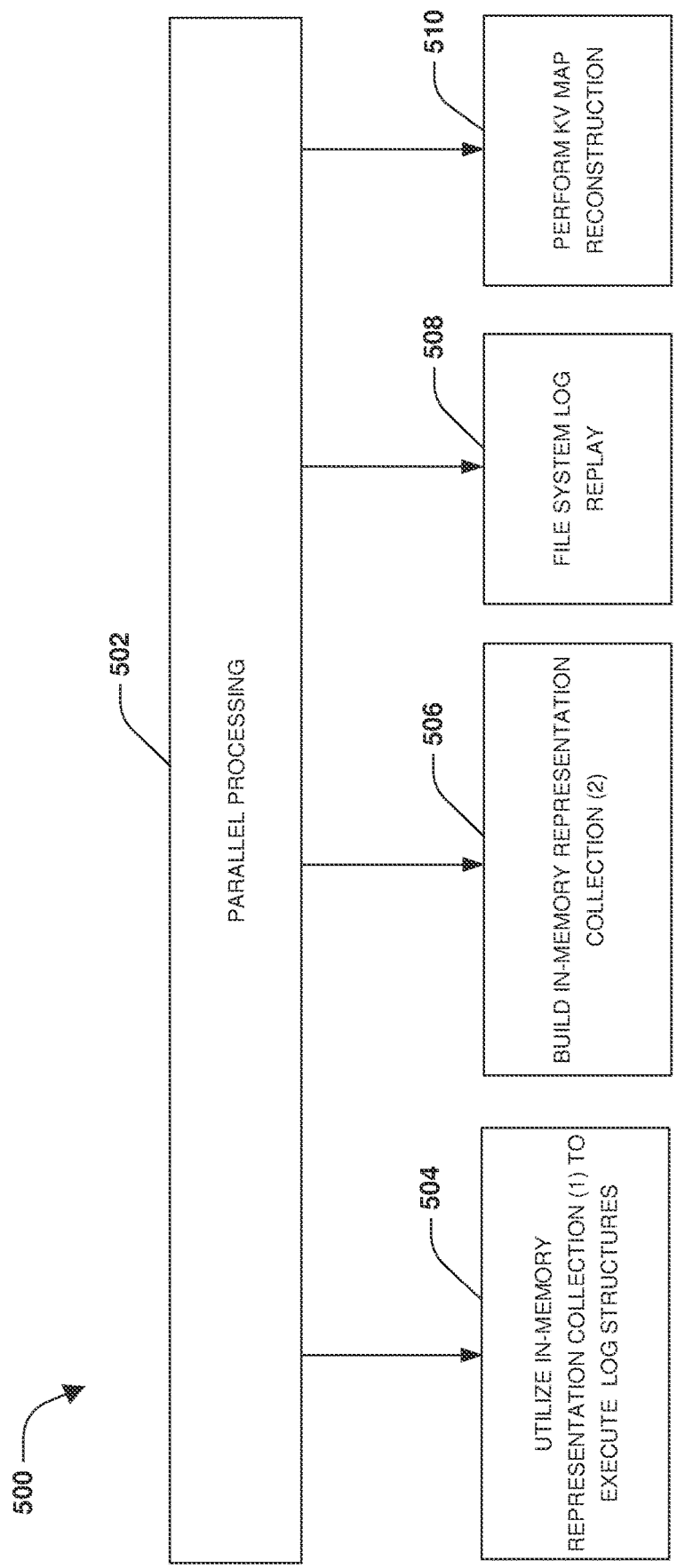
FIG. 5 is a block diagram illustrating an example of parallel processing of operations associated with recovering from a failure in accordance with various embodiments of the present technology.

FIG. 5 is a block diagram 500 illustrating an example of parallel processing of operations associated with recovering from a failure in accordance with various embodiments of the present technology. A node may perform a recovery process in order to recover from the failure. The recovery process may include a rebuild process and a replay operation, as previously discussed. Some of the operations performed by the recovery process may be performed in parallel by parallel processing 502 implemented by the node. As part of the recovery process, groups of log structures may be processed together as collections of log structures. In-memory representations of a first collection of log structures (e.g., a plurality of active log structures) may be rebuilt within volatile memory. Once the in-memory representations of the first collection of log structures is rebuilt in volatile memory, an operation 504 is performed to execute the first collection of log structures using the in-memory representations. In some embodiments, multiple collections of log structures may be executed in parallel. The parallel processing 502 may perform an operation 506 to rebuild in-memory representations for a second collection of log structures (e.g., active log structures) within the volatile memory. In some embodiments, the parallel processing 502 may perform operation 506 to rebuild the in-memory representations of the second collection of log structures while operation 504 is being performed to execute the first collection of log structures. In this way, in-memory representations of a collection of log structures may be rebuilt while already rebuilt in-memory representations is used to execute a different collection of log structures. Additionally, stale log structures may be rebuilt and/or executed by the parallel processing 502 in parallel with operation 504 and/or operation 506.

The parallel processing 502 may perform an operation 508 to execute a file system log replay to rebuild configuration information maintained by a local file system of the node for a local volume separate from the distributed storage. In some embodiments, the parallel process 502 may perform the operation 504, the operation 506, the operation 508, and/or the rebuilding and execution of stale log structures in parallel. The parallel processing 502 may perform an operation 510 to execute a key value map reconstruction to rebuild a key value map within volatile memory of the node. In some embodiments, the parallel process 502 may perform the operation 504, the operation 506, the operation 508, the operation 510, and/or the rebuilding and execution of stale log structures in parallel. In this way, the parallel processing 502 may perform various operations in parallel in order to reduce the time to complete the recovery process so that the node can start processing I/O operations.

Figure 6:
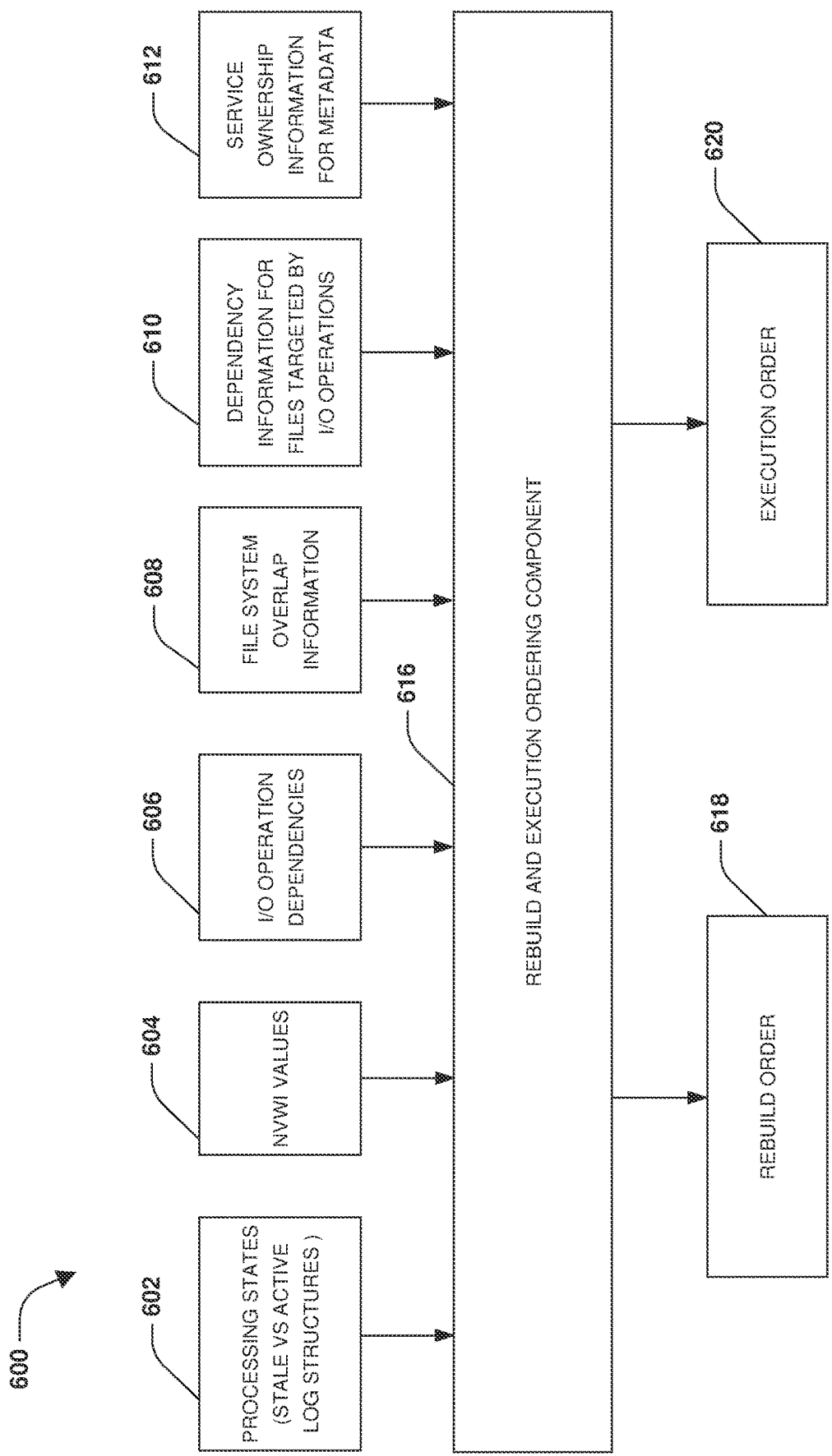
FIG. 6 is a block diagram illustrating an example of determining a rebuild order for a rebuild process and an execution order for a replay operation in accordance with various embodiments of the present technology.

FIG. 6 is a block diagram illustrating an example of determining a rebuild order for a rebuild process and an execution order for a replay operation in accordance with various embodiments of the present technology. A rebuild and execution ordering component 616 may be hosted by a node of a distributed storage architecture. The node may utilize the rebuild and execution ordering component 616 in order to generate a rebuild order 618 and an execution order 620 that can be used by a rebuild component and a replay component for performing a recovery process so that the node can recover from a failure. The rebuild and execution ordering component 616 may take various information into account when generating the rebuild order 618 and the execution order 620.

The rebuild and execution ordering component 616 may take processing states 602 of log structures (active log structures vs stale log structures) and non-volatile write index values 604 (ordering values) assigned to I/O operations within the log structures into account. The rebuild order 618 may be defined such that in-memory representations of active log structures are rebuilt according to the non-volatile write index value 604 and in-memory representations of stale log structures can be rebuilt in any order and/or in parallel with respect to one another and/or with respect to the rebuilding of the in-memory representations of the active log structures. The rebuild and execution ordering component 616 may generate the execution order 620 based upon the processing states 602 and non-volatile write index values 604, such as where log structures can be executed in parallel and I/O operations within a particular log structure are executed according to the non-volatile write index values 604.

The rebuild and execution ordering component 616 may take I/O operation dependencies 606 and file system overlap information 608 into account. The rebuild order 618 may be defined such that if logged I/O operations within a first log structure and logged I/O operations within a second log structure are non-overlapping within a distributed file system (e.g., targeting different files, directories, etc.) and have no dependencies with respect to one another (e.g., an I/O operation is not writing to a file that another I/O operation is creating), then in-memory representations for the log structures can be rebuilt in parallel.

The rebuild and execution ordering component 616 may take dependency information 610 for files targeted by I/O operations into account. The execution order 620 may be defined such that I/O operations targeting different files that are independent of one another can be executed in parallel (e.g., a first I/O operation targeting a database file and a second I/O operation targeting a text document). The rebuild and execution ordering component 616 may take service ownership information 612 of services owning metadata of the I/O operations into account. The rebuild order 618 may be defined such that if logged I/O operations within a first log structure and logged I/O operations within a second log structure comprise metadata used by different services of the node (e.g., different slice services), then in-memory representations for the log structures can be rebuilt in parallel. It may be appreciated that various services hosted by the node are further described in relation to FIG. 7, such as a block service, a slice service, storage services, etc. Also, key value entries can be rebuilt within a key value map based upon the key value entries corresponding to different services of the node. In this way, the rebuild order 618 and the execution order 620 are determined.

Figure 7:
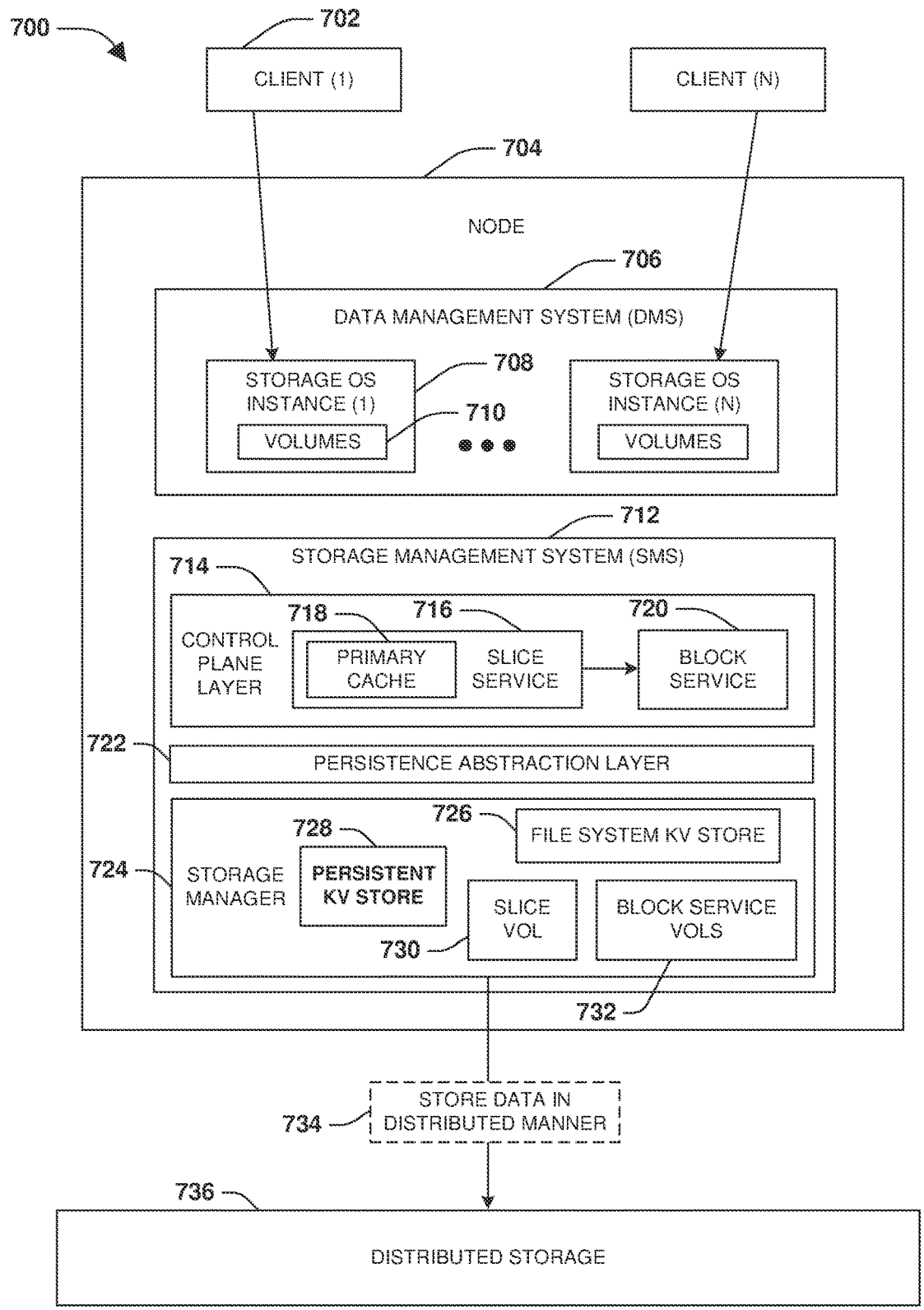
FIG. 7 is a block diagram illustrating an example of a node storing data within distributed storage in accordance with various embodiments of the present technology.

FIG. 7 is a block diagram illustrating an example of a node 704 storing 734 data within distributed storage 736 in accordance with various embodiments of the present technology. In some embodiments, the node 704 may be hosted as a storage application within a container of a container orchestration environment (e.g., a container hosted within Kubernetes). The storage application may provide clients, such as a first client 702, with access to data stored within the distributed storage 736. The node 704 may be composed of a data management system 706 and a storage management system 712 executing within the container.

The data management system 706 is a frontend component of the storage application through which clients can access and interface with node 704 (the storage application). In some embodiments, the first client 702 may transmit I/O operations to a storage operating system instance 708 hosted by the data management system 706 of the storage application. The data management system 706 routes these I/O operations to the storage management system 712 of the node 704.

The storage management system 712 manages the actual storage of data within storage devices of the distributed storage 736, such as managing and tracking where the data is physically stored in particular storage devices. The storage management system 712 may also manage the caching/logging of such data before the data is stored to the storage devices of the distributed storage 736. In this way, data is cached/logged through a primary cache 718 backed by a persistent key-value store 728 (e.g., a persistent store comprising log structures within which I/O operations are logged/cached) within persistent memory of the node 704. In some embodiments, I/O operations are logged as key-value record pairs within the persistent key-value store 728 until data of the key-value record pairs is to be written to the distributed storage 736 as a final destination by a consistency point operation or a recovery process.

Moreover, because the persistent key-value store 728 is a persistent tier, the persistent key-value store 728 does not rely upon a file system to offload data for long term storage. This additionally reduces write amplification that would have been incurred from writing cached content from the cache to the volume using a non-volatile log (NV log) of the file system, and then again from the volume to long term storage through a consistency point operation. Additionally, read operations can be locally served from the persistent key-value store 728, which avoids network hops to remote storage locations of the distributed storage that would otherwise introduce additional latency.

In addition, the persistent key-value store 728 provides a tier which serves as a transient container for data. Moreover, persistent key-value store 728 provides other properties typically not associated with a cache (e.g., journaling, crash protections, resiliency, etc.), while also providing read/write I/O which can be accessed using a key-value interface.

Because the node 704, such as the data management system 706 and the storage management system 712 of the storage application, may be hosted within a container, multiple instances of the storage application may be created and hosted within multiple containers. That is, multiple containers may be deployed to host instances of the storage application that may each service I/O requests from clients. The I/O may be load balanced across the instances of the storage application within the different containers. This provides the ability to scale the storage application to meet demand by creating any number of containers to host instances of the storage application. Each container hosting an instance of the storage application may host a corresponding data management system and storage management system of the storage application. These containers may be hosted on the node 704 and/or at other nodes.

In some embodiments, the data management system 706 may host one or more storage operating system instances, such as the first storage operating system instance 708 accessible to the first client 702 for storing data. In some embodiments, the first storage operating system instance 708 may run on an operating system (e.g., Linux) as a process and may support various protocols, such as NFS, CIFS, and/or other file protocols through which clients may access files through the first storage operating system instance 708. The first storage operating system instance 708 may provide an API layer through which clients, such as the first client 702, may set configurations (e.g., a snapshot policy, an export policy, etc.), settings (e.g., specifying a size or name for a volume), and transmit I/O operations directed to volumes 710 (e.g., FlexVols) exported to the clients by the first storage operating system instance 708. In this way, the clients communicate with the first storage operating system instance 708 through this API layer. The data management system 706 may be specific to the node 704 (e.g., as opposed to a storage management system (SMS) 712 that may be a distributed component amongst nodes of the distributed cluster of nodes). In some embodiments, the data management system 706 and/or the storage management system 712 may be hosted within a container managed by a pod of a container orchestration platform (e.g., Kubernetes).

The first storage operating system instance 708 may comprise an operating system stack that includes a protocol layer (e.g., a layer implementing NFS, CIFS, etc.), a file system layer, a storage layer (e.g., a RAID layer), etc. The first storage operating system instance 708 may provide various techniques for communicating with storage, such as through ZAPI commands, REST API operations, etc. The first storage operating system instance 708 may be configured to communicate with the storage management system 712 through iSCSI, remote procedure calls (RPCs), etc. In some embodiments, the first storage operating system instance 708 may communication with virtual disks provided by the storage management system 712 to the data management system 706, such as through iSCSI and/or RPC.

The storage management system 712 may be implemented by the node 704 as a storage backend. The storage management system 712 may be implemented as a distributed component with instances that are hosted on each of the nodes of the distributed cluster of nodes. The storage management system 712 may host a control plane layer 714. The control plane layer 714 may host a full operating system with a frontend and a backend storage system. The control plane layer 714 may form a control plane that includes control plane services, such as a slice service 716 that manages slices (slice files) used as indirection layers for accessing data on disk, a block service 720 that manages block storage of the data on disk, a transport service used to transport commands through a persistence abstraction layer 722 to a storage manager 724, and/or other control plane services. The slice service 716 may be implemented as a metadata control plane and the block service 720 may be implemented as a data control plane. Because the storage management system 712 may be implemented as a distributed component, the slice service 716 and the block service 720 may communicate with one another on the node 704 and/or may communicate (e.g., through remote procedure calls) with other instances of the slice service 716 and the block service 720 hosted at other nodes within the distributed cluster of nodes.

In some embodiments of the slice service 716, the slice service 716 may utilize slices, such as slice files, as indirection layers. The node 704 may provide the first client 702 with access to a LUN or volume through the data management system 706. The LUN may have N logical blocks that may be 7 kb each. If one of the logical blocks is in use and storing data, then the logical block has a block identifier of a block storing the actual data. A slice file for the LUN (or volume) has mappings that map logical block numbers of the LUN (or volume) to block identifiers of the blocks storing the actual data. Each LUN or volume will have a slice file, so there may be hundreds of slices files that may be distributed amongst the nodes of the distributed cluster of nodes. A slice file may be replicated so that there is a primary slice file and one or more secondary slice files that are maintained as copies of the primary slice file. When write operations and delete operations are executed, corresponding mappings that are affected by these operations are updated within the primary slice file. The updates to the primary slice file are replicated to the one or more secondary slice files. After, the write or deletion operations are responded back to a client as successful. Also, read operations may be served from the primary slice since the primary slice may be the authoritative source of logical block to block identifier mappings.

In some embodiments, the control plane layer 714 may not directly communicate with the distributed storage 736, but may instead communicate through the persistence abstraction layer 722 to the storage manager 724 that manages the distributed storage 736. In some embodiments, the storage manager 724 may comprise storage operating system functionality running on an operating system (e.g., Linux). The storage operating system functionality of the storage manager 724 may run directly from internal APIs (e.g., as opposed to protocol access) received through the persistence abstraction layer 722. In some embodiments, the control plane layer 714 may transmit I/O operations through the persistence abstraction layer 722 to the storage manager 724 using the internal APIs. In some embodiments, the slice service 716 may transmit I/O operations through the persistence abstraction layer 722 to a slice volume 730 hosted by the storage manager 724 for the slice service 716. In this way, slice files and/or metadata may be stored within the slice volume 730 exposed to the slice service 716 by the storage manager 724.

The storage manager 724 may expose a file system key-value store 726 to the block service 720. In this way, the block service 720 may access block service volumes 732 through the file system key-value store 726 in order to store and retrieve key-value store metadata and/or data. The storage manager 724 may be configured to directly communicate with storage devices of the distributed storage 736.

It may be appreciated that a container orchestration platform is merely one example of a computing environment within which the techniques described herein may be implemented, and that the techniques described herein may be implemented in other types of computing environments (e.g., a cluster computing environment of nodes such as virtual machines or physical hardware, a non-containerized environment, a cloud computing environment, a hyperscaler, etc.).

Figure 8:
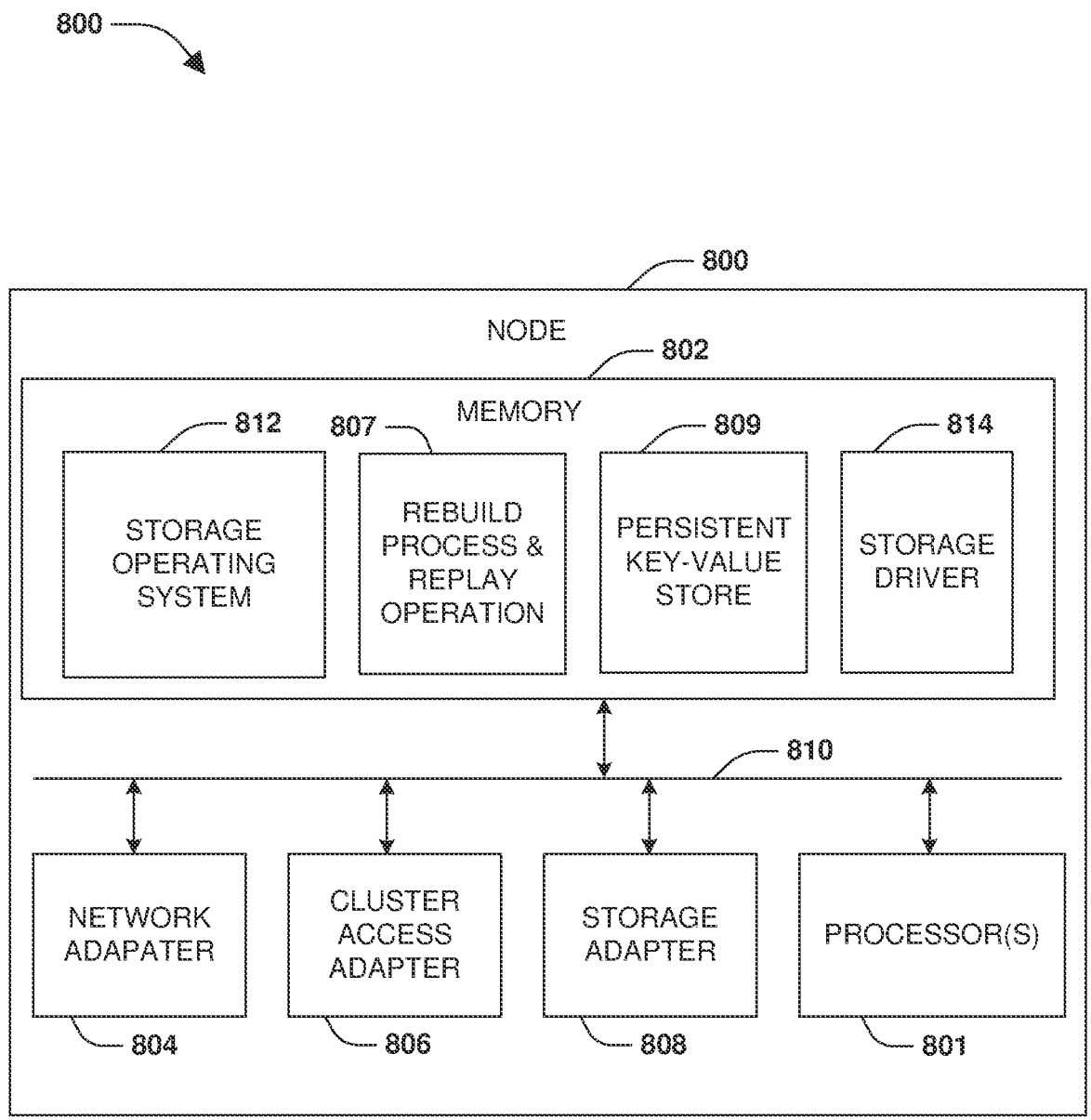
FIG. 8 is a block diagram illustrating an example of a node in accordance with various embodiments of the present technology.

FIG. 8 is a block diagram illustrating an example of a node in accordance with various embodiments of the present technology.

Referring to FIG. 8, a node 800 in this particular example includes processor(s) 801, a memory 802, a network adapter 804, a cluster access adapter 806, and a storage adapter 808 interconnected by a system bus 810. In other examples, the node 800 comprises a virtual machine, such as a virtual storage machine.

The node 800 also includes a storage operating system 812 installed in the memory 802 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 804 in this example includes the mechanical, electrical and signaling circuitry needed to connect the node 800 to one or more of the client devices over network connections, which may comprise, among other things, a point-to-point connection or a shared medium, such as a local area network. In some examples, the network adapter 804 further communicates (e.g., using TCP/IP) via a cluster fabric and/or another network (e.g., a WAN) (not shown) with storage devices of a distributed storage system to process storage operations associated with data stored thereon.

The storage adapter 808 cooperates with the storage operating system 812 executing on the node 800 to access information requested by one of the client devices (e.g., to access data on a data storage device managed by a network storage controller). The information may be stored on any type of attached array of writeable media such as magnetic disk drives, flash memory, and/or any other similar media adapted to store information.

In the exemplary data storage devices, information can be stored in data blocks on disks. The storage adapter 808 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 808 and, if necessary, processed by the processor(s) 801 (or the storage adapter 808 itself) prior to being forwarded over the system bus 810 to the network adapter 804 (and/or the cluster access adapter 806 if sending to another node computing device in the cluster) where the information is formatted into a data packet and returned to a requesting one of the client devices and/or sent to another node computing device attached via a cluster fabric. In some examples, a storage driver 814 in the memory 802 interfaces with the storage adapter to facilitate interactions with the data storage devices.

The storage operating system 812 can also manage communications for the node 800 among other devices that may be in a clustered network, such as attached to the cluster fabric. Thus, the node 800 can respond to client device requests to manage data on one of the data storage devices or storage devices of the distributed storage system in accordance with the client device requests.

A file system module of the storage operating system 812 can establish and manage one or more file systems including software code and data structures that implement a persistent hierarchical namespace of files and directories, for example. As an example, when a new data storage device (not shown) is added to a clustered network system, the file system module is informed where, in an existing directory tree, new files associated with the new data storage device are to be stored. This is often referred to as "mounting" a file system.

In the example node 800, memory 802 can include storage locations that are addressable by the processor(s) 801 and adapters 804, 806, and 808 for storing related software application code and data structures. The processor(s) 801 and adapters 804, 806, and 808 may, for example, include processing elements and/or logic circuitry configured to execute the software code and manipulate the data structures.

The storage operating system 812, portions of which are typically resident in the memory 802 and executed by the processor(s) 801, invokes storage operations in support of a file service implemented by the node 800. Other processing and memory mechanisms, including various computer readable media, may be used for storing and/or executing application instructions pertaining to the techniques described and illustrated herein. For example, the storage operating system 812 can also utilize one or more control files (not shown) to aid in the provisioning of virtual machines.

In some embodiments, a persistent key-value store 809 is implemented as a persistent store within which I/O operations are logged into log structures. If the node 800 experiences a fail, then a recovery process 807 may be performed. The recovery process 807 may include a rebuild process and/or a replay operation that rebuild in-memory representations of the log structures in the persistent key-value store 809. The in-memory representations are used to replay/execute the log structures to update file system metadata of a distributed storage system and/or store data to persistent storage.

The examples of the technology described and illustrated herein may be embodied as one or more non-transitory computer or machine readable media, such as the memory 802, having machine or processor-executable instructions stored thereon for one or more aspects of the present technology, which when executed by processor(s), such as processor(s) 801, cause the processor(s) to carry out the steps necessary to implement the methods of this technology, as described and illustrated with the examples herein. In some examples, the executable instructions are configured to perform one or more steps of a method described and illustrated later.

Figure 9:
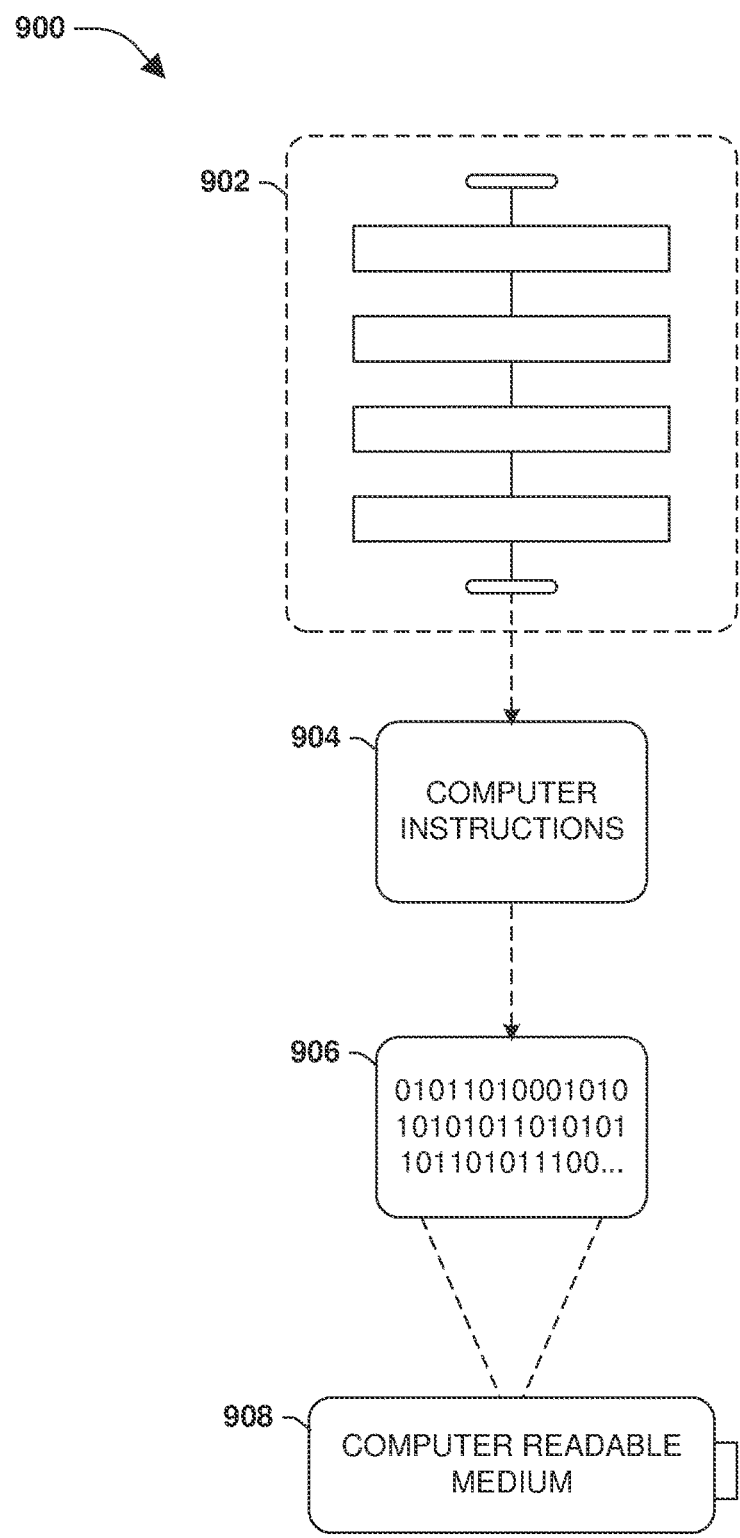
FIG. 9 is an example of a computer readable medium in which various embodiments of the present technology may be implemented.

FIG. 9 is an example of a computer readable medium 900 in which various embodiments of the present technology may be implemented. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. The computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform at least some of the exemplary methods 902 disclosed herein, such as method 400 of FIG. 4, for example. In some embodiments, the processor-executable computer instructions 904 are configured to implement a system, such as at least some of the exemplary systems disclosed herein, such as system 100 of FIGS. 1A-1C, system 500 of FIG. 6, system 600 of FIG. 6, and/or system 700 of FIG. 7, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
logging I/O operations, received by a node of a distributed storage architecture, into log structures of persistent memory of the node for subsequently updating a distributed file system with metadata of the I/O operations and persisting data of the I/O operations to persistent storage of the distributed storage architecture; and
in response to the node recovering from a failure:
grouping a first set of log structures, of the log structures, into a first group and grouping a second set of log structures, of the log structures, into a second group based upon the first set of log structures having a first processing state and the second set of log structures having a second processing state;
determining a rebuild order based on processing states of the log structures, wherein a first set of in-memory representations are identified as being able to be rebuilt irrespective of the rebuild order based upon the first set of in-memory representations corresponding to the first group, and wherein a second set of in-memory representations are identified for being rebuilt according to the rebuild order based upon the second set of in-memory representations corresponding to the second group;
implementing a rebuild process to rebuild the first set of in-memory representations irrespective of the rebuild order and to rebuild the second set of in-memory representations according to the rebuild order; and
performing a replay operation using one or more of the first set of in-memory representations or the second set of in-memory representations rebuilt by the rebuild process to update the distributed file system with the metadata and persist the data to the persistent storage.

2. The method of claim 1, wherein performing the replay operation comprises:
utilizing in-memory representations to execute the log structures according to an execution order for updating the distributed file system with the metadata and persisting the data to the persistent storage, wherein the execution order is defined based upon the processing states of the log structures and non-volatile write index values assigned to the I/O operations.

3. The method of claim 2, comprising:
evaluating the log structures to perform a key value map reconstruction to reconstruct a key value map with key value entries used to locate data of the I/O operations stored within the persistent memory, wherein the key value map reconstruction is performed in parallel with the rebuild process; and utilizing the key value map during execution of the log structures for locating the data of the I/O operations being executed.

4. The method of claim 1, comprising:
determining that a log structure has the first processing state indicating that metadata within the log structure has been used to update the distributed file system and that data within the log structure has not yet been stored to the persistent storage.

5. The method of claim 1, comprising:
determining that a log structure has the second processing state indicating that metadata within the log structure has not yet been used to update the distributed file system and that data within the log structure has not yet been stored to the persistent storage.

6. The method of claim 1, wherein determining the rebuilt order comprises:
determining the rebuild order based upon an ordering of non-volatile write index values assigned to I/O operations logged within the second set of log structures having the second processing state.

7. The method of claim 1, comprising:
rebuilding a first in-memory representation and a second in-memory representation in parallel based upon the first in-memory representation and the second in-memory representation corresponding to log structures of I/O operations that are non-overlapping within the distributed file system and have no dependencies with respect to one another.

8. The method of claim 1, wherein performing the replay operation comprises:
in response to identifying a set of in-memory representations corresponding to log structures of logged I/O operations that target different files that are independent of one another, utilizing the set of in-memory representations to execute the logged I/O operations in parallel.

9. The method of claim 1, comprising:
performing a file system log replay to rebuild configuration information maintained by a local file system of the node for a local volume separate from the persistent storage, wherein the file system log replay is performed in parallel with at least one of the rebuild process or the replay operation, wherein the file system log replay enforces a serial ordering of building configuration information for a data set, and wherein the serial ordering is different than the rebuild order.

10. The method of claim 1, comprising:
rebuilding a first in-memory representation and a second in-memory representation in parallel based upon the first in-memory representation and the second in-memory representation corresponding to log structures of logged I/O operations comprising metadata used by different services.

11. A system, comprising:
a distributed storage architecture comprising persistent storage managed by a plurality of nodes, wherein the plurality of nodes comprises a node that includes:
persistent memory within which I/O operations are logged into log structures for subsequently updating a distributed file system with metadata of the I/O operations and persisting data of the I/O operations to the persistent storage of the distributed storage architecture;
volatile memory within which in-memory representations of the log structures are stored;

a rebuild component that in response to the node recovering from a failure:
    groups a first set of log structures, of the log structures, into a first group and a second set of log structures, of the log structures, into a second group based upon the first set of log structures having a first processing state and the second set of log structures having a second processing state;
    determines a rebuild order based on processing states of the log structures, wherein a first set of in-memory representations are identified as being able to be rebuilt irrespective of the rebuild order based upon the first set of in-memory representations corresponding to the first group, and wherein a second set of in-memory representations are identified for being rebuilt according to the rebuild order based upon the second set of in-memory representations corresponding to the second group; and
    implements a rebuild process to rebuild the first set of in-memory representations irrespective of the rebuild order and to rebuild the second set of in-memory representations according to the rebuild order; and
a replay component that uses one or more of the first set of in-memory representations or the second set of in-memory representations rebuilt by the rebuild process to update the distributed file system with the metadata and persist the data to the persistent storage.

12. The system of claim 11, wherein the replay component:
utilizes the first set of in-memory representations to replay the first set of log structures in parallel, wherein content of a log structure is processed serially.

13. The system of claim 11, wherein the rebuild component serially rebuilds collections of in-memory representations of the second set of in-memory representations according to an ordering of non-volatile write index values assigned to I/O operations logged within corresponding log structures having the second processing state; and wherein the replay component executes logged I/O operations associated with a first collection of the second set of in-memory representations in parallel with a second collection of the second set of in-memory representations being rebuilt by the rebuild process.

14. The system of claim 11, wherein the replay component:
executes logged I/O operations associated with a plurality of collections of the second set of in-memory representations in parallel.

15. The system of claim 11, wherein the rebuild component:
rebuilds collections of in-memory representations of the first set of in-memory representations in parallel.

16. The system of claim 11, wherein the rebuild component:
performs a key value map reconstruction to reconstruct a key value map with key value entries, wherein the first set of log structures are processed in parallel for reconstructing the key value entries within the key value map.

17. The system of claim 11, wherein the rebuild component:
performs a key value map reconstruction to reconstruct a key value map with key value entries, wherein key value entries are reconstructed in parallel based upon the key value entries corresponding to different services hosted by the node.

18. The system of claim 11, wherein the replay component:
coalesces multiple records of I/O operations into a single file system message based upon the multiple records of I/O operations corresponding to contiguous blocks in a file, and wherein the single file system message is executed by the distributed file system of the node.

19. The system of claim 11, wherein the log structures are stored within a persistent store hosted within the persistent memory, wherein the persistent store is implemented as a persistent key value store configured as a primary cache for the node, and wherein the node:
caches the I/O operations as key value record pairs within the log structures, wherein a key value record pair includes a key record of metadata paired with a value record of data.

20. The system of claim 19, wherein the node:
creates a log structure as an active chain to include an operation header bucket for recording key records and metadata of the key records, a data bucket for recording value records, and a meta bucket for recording bucket chain metadata as a pointer to the operation header bucket that points to the data bucket.

21. A non-transitory machine readable medium comprising instructions, which when executed by a machine, causes the machine to:
log I/O operations, received by a node of a distributed storage architecture, into log structures of persistent memory of the node for subsequently updating a distributed file system with metadata of the I/O operations and persisting data of the I/O operations to persistent storage of the distributed storage architecture; and
in response to the node recovering from a failure:
    group a first set of log structures, of the log structures, into a first group and grouping a second set of log structures, of the log structures, into a second group based upon the first set of log structures having a first processing state and the second set of log structures having a second processing state;
    determine a rebuild order based on processing states of the log structures, wherein a first set of in-memory representations are identified as being able to be rebuilt irrespective of the rebuild order based upon the first set of in-memory representations corresponding the first group, and wherein a second set of in-memory representations are identified for being rebuilt according to the rebuild order based upon the second set of in-memory representations corresponding to the second group; and
    implement a rebuild process to rebuild the first set of in-memory representations irrespective of the rebuild order and to rebuild the second set of in-memory representations according to the rebuild order.

* * * * *